United States Patent
Sudo

(10) Patent No.: US 9,692,971 B2
(45) Date of Patent: Jun. 27, 2017

(54) IMAGE CAPTURING APPARATUS CAPABLE OF AUTOMATICALLY SWITCHING FROM REPRODUCTION MODE TO SHOOTING MODE AND DISPLAYING LIVE VIEW IMAGE AND CONTROL METHOD THEREOF

(71) Applicant: CANON KABUSHIKI KAISHA, Tokyo (JP)

(72) Inventor: Koji Sudo, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 15 days.

(21) Appl. No.: 14/925,309

(22) Filed: Oct. 28, 2015

(65) Prior Publication Data
US 2016/0127645 A1 May 5, 2016

(30) Foreign Application Priority Data

Oct. 31, 2014 (JP) ................................. 2014-223190
Oct. 31, 2014 (JP) ................................. 2014-223350
Oct. 31, 2014 (JP) ................................. 2014-223351

(51) Int. Cl.
*H04N 5/232* (2006.01)

(52) U.S. Cl.
CPC ..... *H04N 5/23245* (2013.01); *H04N 5/23293* (2013.01)

(58) Field of Classification Search
None
See application file for complete search history.

(56) References Cited

U.S. PATENT DOCUMENTS

| 6,862,040 B1* | 3/2005 | Sawachi | H04N 1/2112 348/231.3 |
| 2004/0165085 A1 | 8/2004 | Shibutani | |
| 2005/0243185 A1* | 11/2005 | Son | H04N 5/23293 348/222.1 |

(Continued)

FOREIGN PATENT DOCUMENTS

| JP | 4445657 B | 4/2010 |
| JP | 2010-245810 A | 10/2010 |

(Continued)

OTHER PUBLICATIONS

The above patent documents were cited in a European Search Report issued on Apr. 7, 2016, which is enclosed, that issued in the corresponding European Patent Application No. 15189278.3.

*Primary Examiner* — Justin P Misleh
(74) *Attorney, Agent, or Firm* — Cowan, Liebowitz & Latman, P.C.

(57) ABSTRACT

An image capturing apparatus includes a mode switching unit which, in response to an instruction from a user, switches an operation mode of the apparatus, a display control unit which controls such that a reproduced image is displayed in a reproduction mode, and a control unit controls such that, when a reproduced image is displayed in the reproduction mode, in response to accepting a specific instruction, based on attribute information of the reproduced image being displayed, at least a part of settings from shooting settings for when the reproduced image was shot are set in the apparatus, switching from a reproduction mode to a shooting mode is performed, and a live view image in which the part of settings are reflected is displayed.

15 Claims, 22 Drawing Sheets

(56) References Cited

U.S. PATENT DOCUMENTS

| | | | |
|---|---|---|---|
| 2005/0254793 A1* | 11/2005 | Son | H04N 1/00962 |
| | | | 386/227 |
| 2006/0164536 A1* | 7/2006 | Abe | H04N 5/23245 |
| | | | 348/333.01 |
| 2006/0216016 A1* | 9/2006 | Eun | G03B 17/02 |
| | | | 396/222 |

FOREIGN PATENT DOCUMENTS

| | | |
|---|---|---|
| JP | 2011-103548 A | 5/2011 |
| JP | 2011-135392 A | 7/2011 |
| JP | 2012-029055 A | 2/2012 |
| WO | 2013/183338 A1 | 12/2013 |

\* cited by examiner

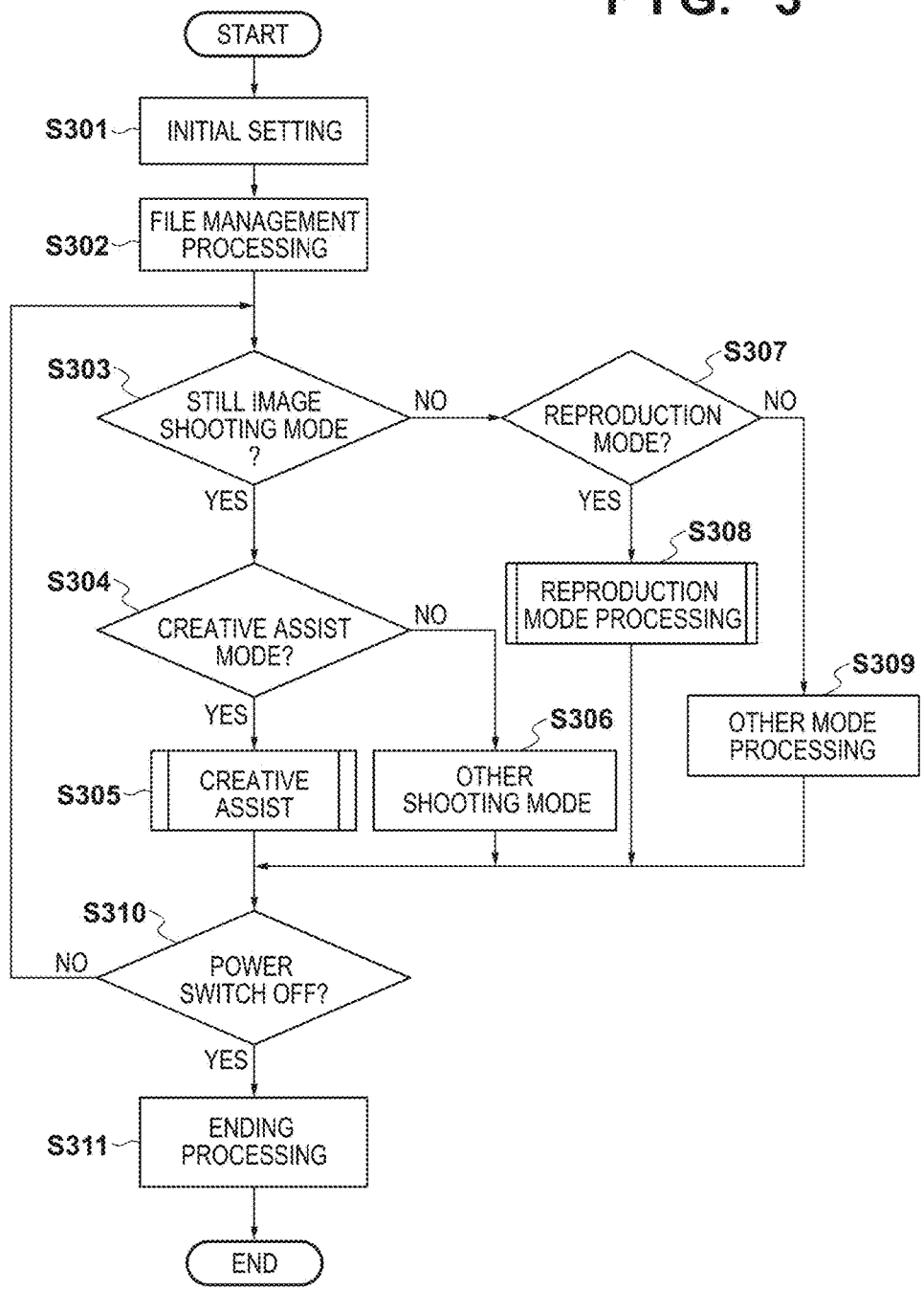

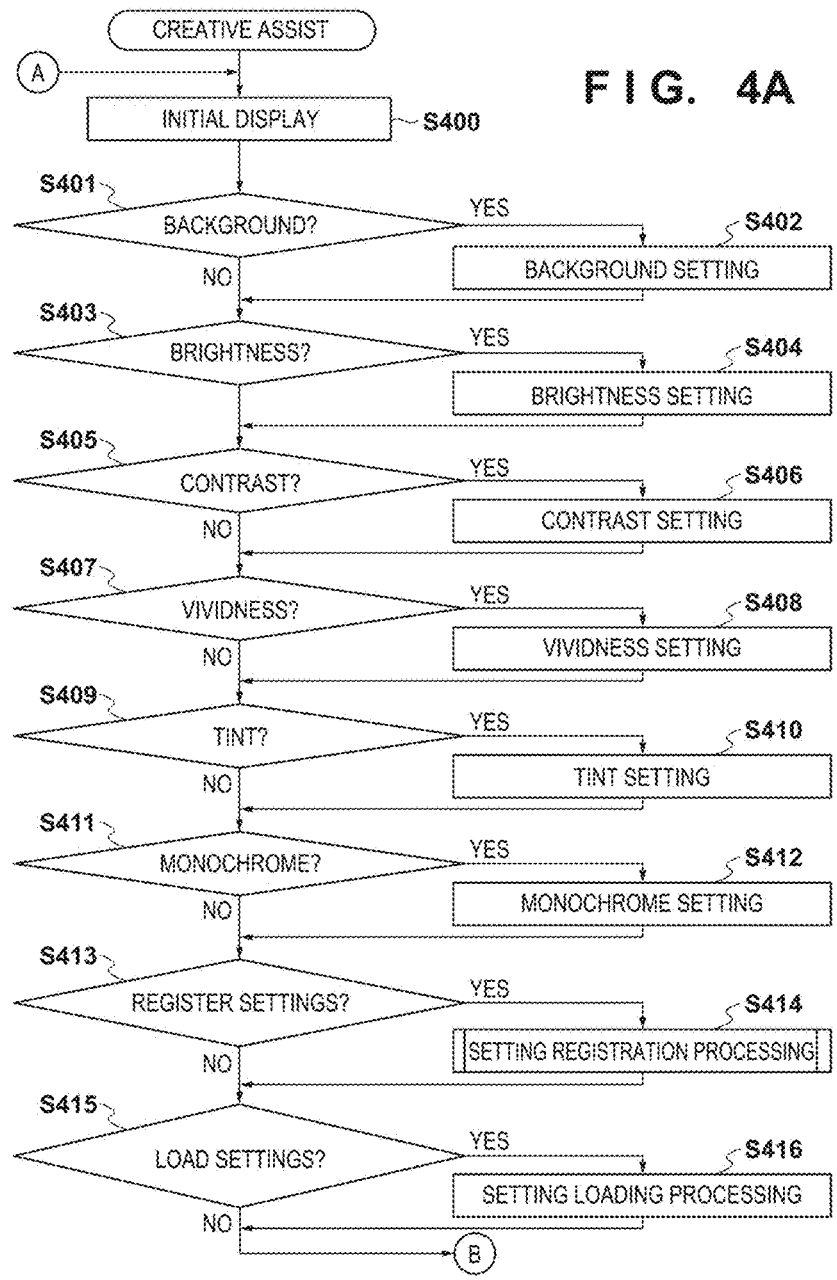

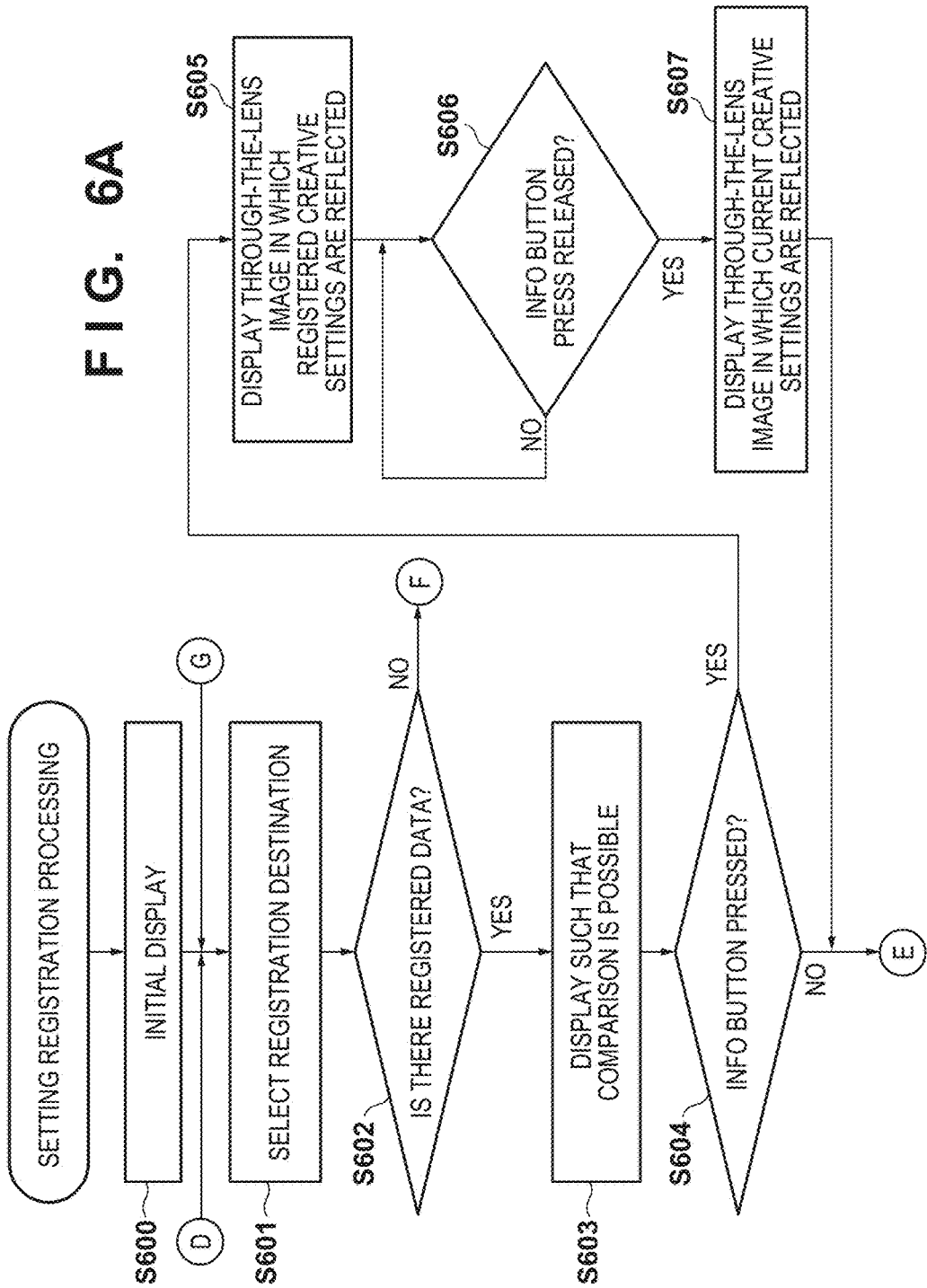

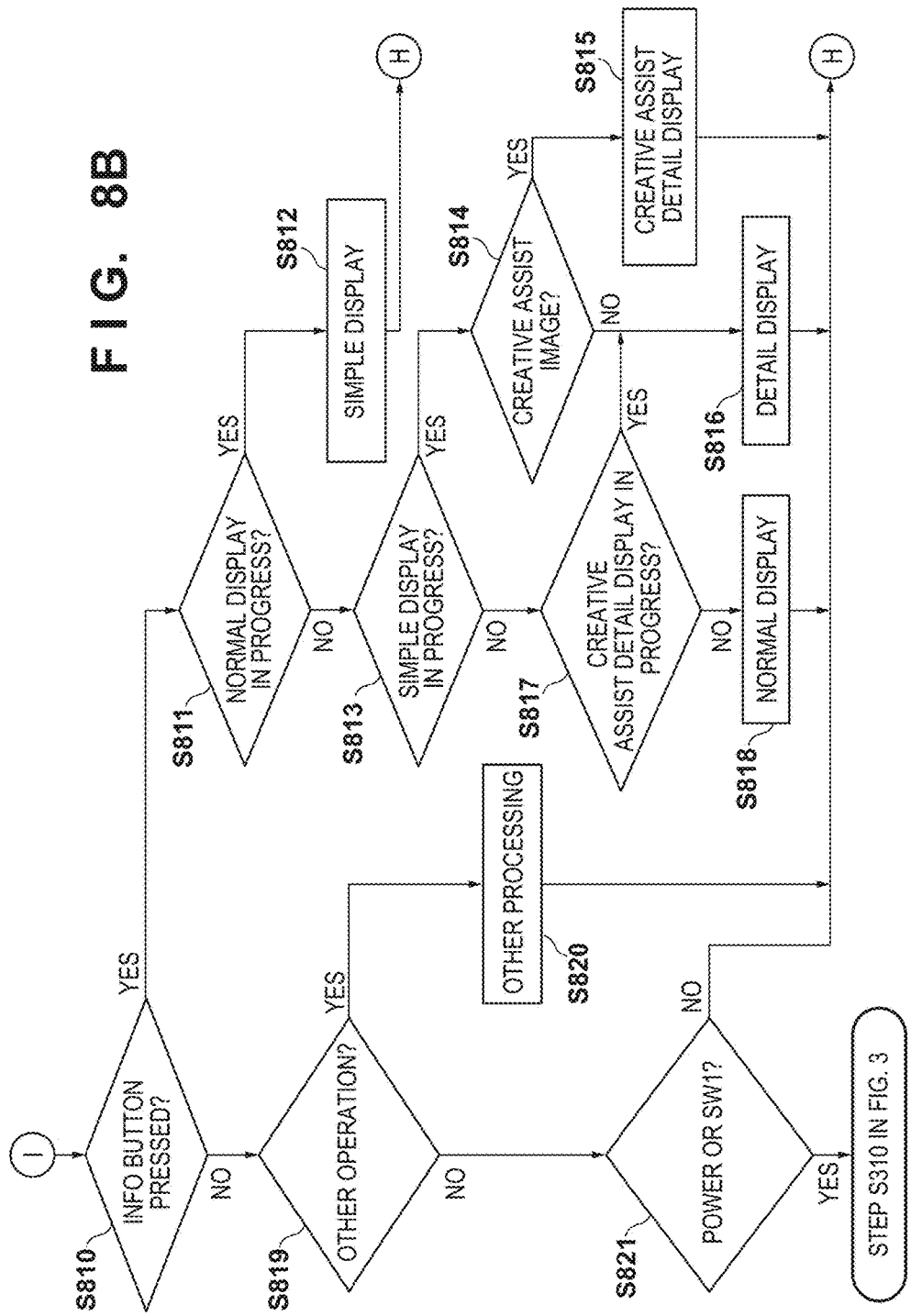

IMAGE CAPTURING APPARATUS CAPABLE OF AUTOMATICALLY SWITCHING FROM REPRODUCTION MODE TO SHOOTING MODE AND DISPLAYING LIVE VIEW IMAGE AND CONTROL METHOD THEREOF

BACKGROUND OF THE INVENTION

Field of the Invention

The present invention relates to an image capturing apparatus and a control method thereof, particularly relates to a technique for setting shooting conditions for an image.

Description of the Related Art

In recent years, shooting functions have increased accompanying the evolution of image capturing apparatuses. While it has become possible to enjoy various ways of creating pictures by combining multiple parameters according to the scene, setting of shooting parameters has become complicated. There has been demand for a function according to which one's favorite shooting parameters can be easily set.

Japanese Patent No. 4445657 discloses a technique of reading out shooting conditions and image processing conditions stored in correspondence with image data of a selected reproduced image and setting shooting conditions and image processing of a digital camera based on these pieces of information.

However, according to Japanese Patent No. 4445657, although the image processing conditions for a reproduced image can be set as the shooting conditions, it is not possible to reflect shooting settings for an image being reproduced and make a transition to a shooting mode immediately.

SUMMARY OF THE INVENTION

The present invention has been made in consideration of the aforementioned problems, and realizes an image capturing apparatus according to which shooting settings for an image being reproduced can be reflected and a transition to a shooting mode can be made immediately.

In order to solve the aforementioned problems, the present invention provides an image capturing apparatus comprising: a mode switching unit configured to, in response to an instruction from a user, switch an operation mode of the image capturing apparatus to one of a plurality of operation modes including a shooting mode and a reproduction mode; a display control unit configured to perform control such that a reproduced image is displayed in the reproduction mode; and a control unit configured to perform control such that, when a reproduced image is displayed in the reproduction mode, in response to accepting a specific instruction, based on attribute information of the reproduced image being displayed, at least a part of settings from shooting settings for when the reproduced image was shot are set in the image capturing apparatus, switching from a reproduction mode to a shooting mode is performed, and a live view image in which the part of settings are reflected is displayed.

In order to solve the aforementioned problems, the present invention provides a control method of an image capturing apparatus comprising: a mode switching step of, according to an instruction from a user, switching an operation mode of the image capturing apparatus to one of a plurality of operation modes including a shooting mode and a reproduction mode; a display control step of performing control such that a reproduced image is displayed in the reproduction mode; and a control step of performing control such that, when a reproduced image is displayed in the reproduction mode, in response to accepting a specific instruction, based on attribute information of the reproduced image being displayed, at least a part of settings from shooting settings for when the reproduced image was shot are set in the image capturing apparatus, switching from a reproduction mode to a shooting mode is performed, and a live view image in which the part of settings are reflected is displayed.

According to the present invention, the shooting settings for an image being reproduced can be reflected and transition to the shooting mode can be made immediately.

Further features of the present invention will become apparent from the following description of exemplary embodiments (with reference to the attached drawings).

BRIEF DESCRIPTION OF THE DRAWINGS

FIG. 3 is a flowchart showing mode setting processing of an image capturing apparatus according to the present embodiment.

FIGS. 4A and 4B are flowcharts showing creative assist mode processing of FIG. 3.

FIGS. 6A and 6B are flowcharts showing setting registration processing of FIG. 4A.

FIGS. 8A and 8B are flowcharts showing reproduction mode processing of FIG. 3.

DESCRIPTION OF THE EMBODIMENTS

Embodiments of the present invention will be described below in detail with reference to accompanied drawings.

Apparatus Configuration

Figure 1:
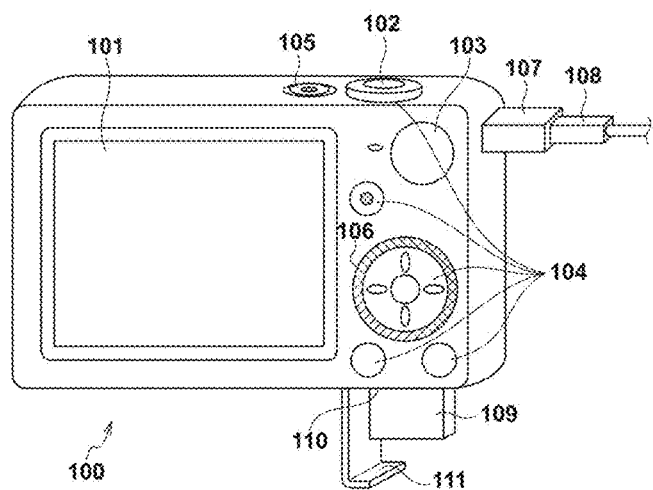
FIG. 1 is a diagram showing an appearance of the back of an image capturing apparatus according to a present embodiment.
Figure 2:
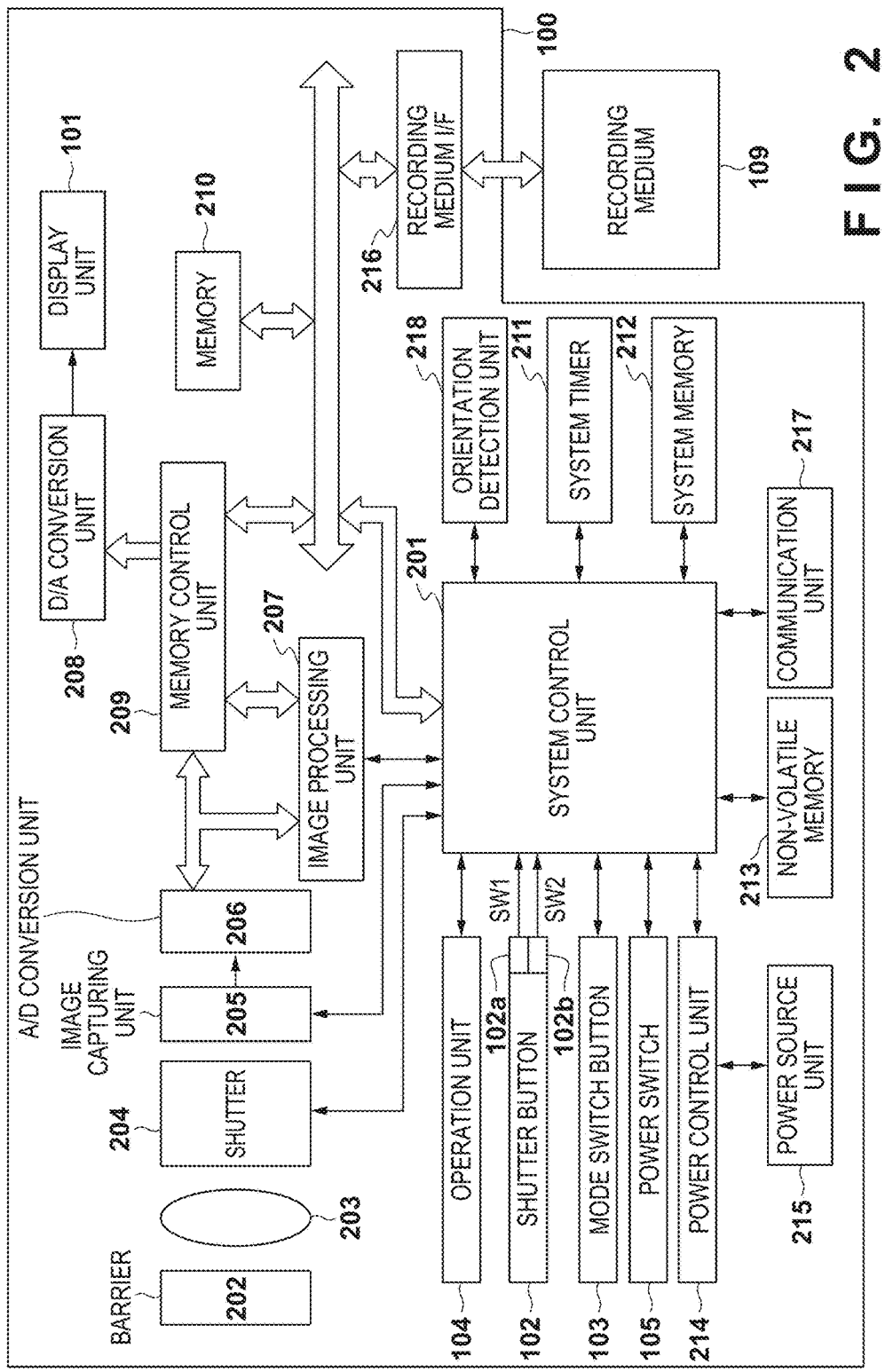
FIG. 2 is a block diagram showing an image capturing apparatus according to the present embodiment.

Reference will be given to FIGS. 1 and 2 to describe the functions and external appearance of an image capturing apparatus (an image processing apparatus, display control apparatus, and electronic device). A digital camera is taken as an example of the image capturing apparatus, the image processing apparatus, display control apparatus, and electronic device in this embodiment.

In FIG. 1 which shows an external appearance of a digital camera 100 according to the present embodiment, a display unit 101 displays images and various information. A shutter-release button 102 is an operation unit for shooting. A mode switching button 103 is an operation unit for switching between various modes. A connector 107 is an interface that connects a connection cable 108 with a digital camera 100. Operation units 104 comprise operation members such as various switches, buttons, a touch panel and electronic dial operated in various ways by the user. An electronic dial is a rotatable operation member arranged on a front side of a camera body. A controller wheel 106 is a rotatable operation member included among the operation units 104. A power switch 105 switches between power on and power off. A recording medium 109 is a medium such as a memory card or hard disk. A recording medium slot 110 is for accommodating the recording medium 109. The recording medium 109 accommodated in the recording medium slot 110 makes it possible to communicate with the digital camera 100. A cover 111 covers the recording medium slot 110.

In FIG. 2 which shows an internal configuration of a digital camera 100 according to the present embodiment, a photographing lens 203 includes a zoom lens and a focusing lens. A shutter 204 has a diaphragm function. An image capturing unit 205 is an image sensor, which is constituted by a CCD, CMOS, or the like, for converting the optical image of an object to an electric signal. An A/D converter 206 converts an analog signal to a digital signal. The A/D converter 206 is used to convert an analog signal, which is output from the image capturing unit 205, to a digital signal. A barrier 202 covers the image capturing system (which includes the photographing lens 203) of the digital camera 100, thereby preventing contamination of and damage to the image capturing system that includes the photographing lens 203, shutter 204, and image capturing unit 205.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 207 performs predetermined calculation processing using the captured image data, and AWB (Automatic White Balance) processing of TTL type is performed on the basis of the calculation results.

The data from the A/D converter 206 is directly written into a memory 210 via both the image processing unit 207 and the memory control unit 209 or via the memory control unit 209. The memory 210 stores the image data obtained from the image capturing unit 205 and converted into digital data by the A/D converter 206, and image display data to be displayed on the display unit 101. The memory 210 has a storage capacity that is sufficient for storing a predetermined number of still images as well as moving images and audio for a predetermined time period.

The memory 210 also functions as a memory for image display (video memory). A D/A converter 208 converts the image display data stored in the memory 210 into an analog signal and applies the display unit 101 with the analog signal. In this manner, the image display data that was written into the memory 210 is displayed by the display unit 101 via the D/A converter 208. The display unit 101 performs, on a display device such as an LCD, display in accordance with the analog signal from the D/A converter 208. The digital signals once converted by the A/D converter 206 and stored in the memory 210 are converted into analog signals by the D/A converter 208, and the analog signals are successively transmitted to the display unit 101 so as to be displayed thereon, making it possible to realize an electronic view finder (EVF) functionality and to perform through-the-lens image display. The through-the-lens image is also called live view image.

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later.

The system control unit 201 is a calculation processing device for overall controlling the entire camera 100, and realizes, by executing the programs stored in the nonvolatile memory 213, the procedures of the flowchart that will be described later. The system memory 212 is, for example, a RAM and used also as a work memory where constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a timer circuit for measuring time periods for various types of controls and the time of an integrated clock.

A mode switching button 103, a first shutter switch 102a, a second shutter switch 102b, and the operation units 104 are operation members for inputting various types of instructions into the system control unit 201.

The mode switching button 103 switches the operation mode of the system control unit 201 to any of a plurality of still image shooting modes, any of a moving image recording mode, and a reproduction mode. The still image shooting mode includes an automatic shooting mode, an automatic scene determination mode, a manual mode, scene-specific shooting modes, a program AE mode, a custom mode, a creative assist mode and the like. Using the mode switching button 103, the mode is directly switched to any of the plurality of modes included in the still image shooting mode. Similarly, the moving image recording mode may also include a plurality of modes.

While the shutter button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 207 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from the image capturing unit 205 to writing of image data to the recording medium 109.

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button, an INFO button, an erase button and the like. For example, a notification for a menu switching instruction is given and a menu screen that enables various settings to be made is displayed on the display unit 101 by pressing a menu button. The user can make various settings intuitively by using the menu screen, which is displayed on the display unit 101, four-direction (up, down, left, right) buttons and a SET button. A reproduction button is also included in the operation units 104. The reproduction button is a button for switching between a shooting mode and a reproduction mode, and is provided separately from the above-mentioned mode switching button 103. If the reproduction button is pressed while the power is off, the power is turned on in reproduction mode, and a reproduced image is displayed. If the reproduction button is pressed while in shooting mode, transition to the reproduction mode is made, and a reproduced image is displayed. If the reproduction button is pressed while in the reproduction mode, the transition to the currently-selected shooting mode among the multiple shooting modes is made, and a live view image is displayed.

Included among the operation units 104 is also a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system control unit 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power control unit 214 is constituted by, for example, a battery detection circuit, a DC-DC converter, a switch circuit for changing over the block to be supplied with power, and detects a battery has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li-ion battery, or an AC adaptor. The recording medium interface (I/F) 216 is for interfacing with the recording medium 109 (the memory card or hard disk, or the like). The recording medium 109 is a recording medium such as a memory card for recording shot images, and constituted by a semiconductor memory, a magnetic disk, or the like.

A communication unit 217 performs transmitting/receiving video and sound to/from an external device communicably connected via a wireless antenna or wired cable. The communication unit 217 is also connectable to a wireless LAN (Local Area Network) and the Internet. The communication unit 217 can transmit an image (including a through-the-lens image) captured by the image capturing unit 205 and an image file recorded in the recording medium 109 to an external device, and receive image data and other various kinds of information from an external device.

An orientation detection unit 218 detects the orientation of the digital camera 100 with respect to the gravity direction. In this case, based on the orientation detected by the orientation detection unit 218, it is possible to discriminate whether an image captured by the image capturing unit 205 has been shot by setting the digital camera 100 in the landscape or portrait direction. The system control unit 201 can add information about the orientation detected by the orientation detection unit 218 to the image file, and rotate and record the captured image. An orientation detection unit 218 such as an acceleration sensor, gyro sensor and the like may be used as an orientation detection unit.

Note that the hardware configuration is not limited to that shown in FIG. 2, and a configuration is also possible in which, for example, a single item of hardware performs display control, communication control, recording control, image processing control, and the like, so as to function as each unit or block of the digital camera 100. Alternatively, it is also possible that a plurality of items of hardware operate in cooperation with each other to function as a single unit or block.

The digital camera 100 can be used by switching between at least a reproduction mode used to reproduce an image and a shooting mode used to shoot an image. The shooting mode includes an auto mode, manual mode, and a plurality of scene-specific shooting modes. The auto mode is a mode in which a program installed in the digital camera 100 automatically determines various parameters of the camera based on a measured exposure value. The manual mode is a mode in which the user can freely change various parameters of the camera. The scene-specific shooting mode is a shooting mode implemented for each shooting scene by combining a shutter speed, f-number, the status of flash emission, sensitivity setting, white balance (WB) setting, picture style function and the like which are suitable for the shooting scene. The picture style function can be used to adjust the sharpness, contrast, hue, and saturation to be optimal for each selected scene, such as portrait, landscape, or monochrome. A portrait mode, sports mode, landscape mode, snow mode, beach mode, and the like are examples of scene-specific shooting modes.

The digital camera 100 includes the following shooting modes (1) to (4) in addition to the above-mentioned modes.

(1) Program AE mode: A mode in which the shutter speed and aperture value are set automatically and other functions can be selected freely.

(2) Shutter speed priority AE mode (shutter speed priority mode, Tv priority mode): A mode in which object movement can be stopped or fluid motion can be expressed by changing the shutter speed.

(3) Aperture priority AE mode (aperture priority AE mode, Av priority mode): A mode in which the background can be blurred to emphasize the object or both the background and the object can be brought into focus by changing the aperture value.

(4) Creative assist mode: Mode in which shooting can be performed easily with desired effects added. A mode in which settings can be registered or loaded.

Manual mode, program AE mode, shutter speed priority AE mode, and aperture value priority AE mode are referred to as "applied shooting modes" due to the fact that the user can freely change camera settings in them. Modes in which shooting can be performed using simple settings, such as auto mode, scene-specific shooting modes, and creative assist mode, are referred to as "simple shooting modes".

The photographer can perform shooting by setting the digital camera 100 to a desired shooting mode from a shooting mode selection menu.

Mode Setting Processing

Next, mode setting processing performed by a digital camera 100 according to the present embodiment will be described with reference to FIG. 3.

Note that processing in FIG. 3 is started when the power is turned on using the power switch 105, and the processing is realized by the program recorded in the nonvolatile memory 213 being read out into the system memory 212 and executed by the system control unit 201.

In step S301, the system control unit 201 initializes the flags, control variables, and the like, and in step S302, the system control unit 201 starts management processing for files recorded in the recording medium 109.

In steps S303, S304, and S307, the system control unit 201 determines the current operation mode. That is to say, in step S303, the system control unit 201 determines whether or not a still image shooting mode is set as the current operation mode, and if it is, the system control unit 201 determines whether or not the creative assist mode is the current operation mode, which is one of multiple still image shooting modes, according to the position of the mode switching button 103 (step S304). If it is determined that the creative assist mode is the current operation mode, the processing moves to step S305, and the system control unit 201 performs the creative assist mode processing. The creative assist mode will be described later in detail with reference to FIGS. 4A-4B. On the other hand, if a mode other than the creative assist mode is the current operation mode, the processing moves to step S306, and the system control unit 201 performs processing for the other shooting mode. The other shooting mode is an applied shooting mode such as the manual mode, the program AE mode, the shutter speed priority AE mode, or the aperture priority AE mode, for example.

If it is determined in step S303 that a mode other than a still image shooting mode is the current operation mode, the processing moves to step S307, and the system control unit 201 determines whether or not the reproduction mode is set as the current operation mode. If it is determined that the reproduction mode is the current operation mode, the processing moves to step S308 and the system control unit 201 performs the processing of the reproduction mode, and if it is determined that a mode other than the reproduction mode is the current operation mode, the processing moves to step S309 and the system control unit 201 performs the other mode processing. The reproduction mode processing will be described later in detail with reference to FIGS. 8A and 8B. The other mode includes transmission mode processing for transmitting a file stored in the recording medium 109, reception mode processing for receiving a file from an external device and storing it in the recording medium 109, and moving image shooting mode processing, for example.

The processing corresponding to the mode set in steps S305, S306, S308, and S309 is performed, and thereafter, in step S310, the system control unit 201 determines the setting position of the power switch 105. If it is determined that the power has been set to on, the processing returns to step S303, and if it is determined that the power has been set to off, the system control unit 201 performs ending processing (step S311). The ending processing includes the following processing, for example. That is to say, the display of the display unit 101 is changed to an ending state, and the lens barrier 202 is closed so as to protect the image capturing unit 205. Also, parameters including flags, control variables, and the like, setting values, and setting modes are recorded in the non-volatile memory 213, and power to portions where power supply is at needed is cut off.

When the ending processing in step S311 is complete, the processing ends, and transition to the power off state is made.

Creative Assist Mode Processing

Next, processing of the creative assist mode in step S305 of FIG. 3 will be described with reference to FIGS. 4A and 4B and 5A-5H.

First, various types of display screens in the creative assist mode will be described with reference to FIG. 5.

Figure 5A:
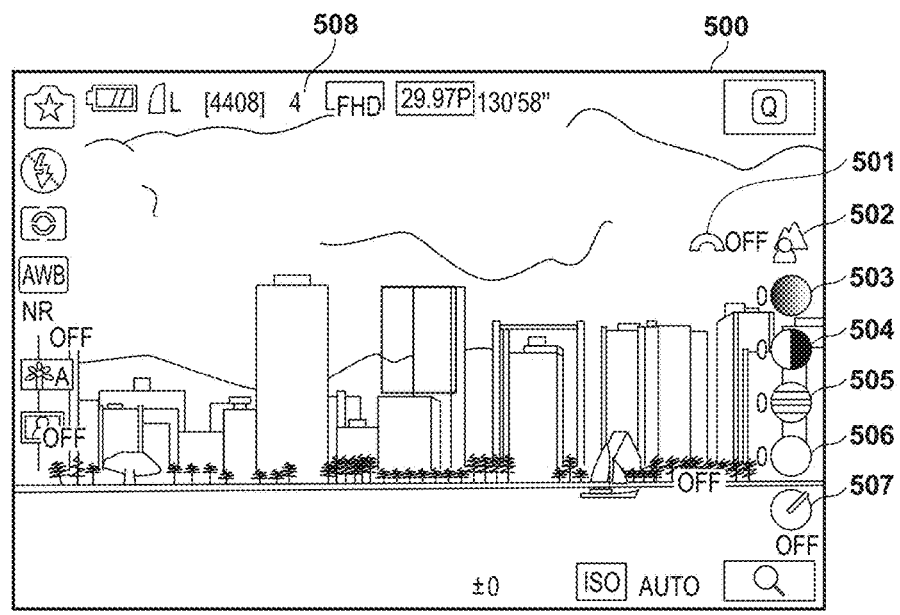
FIGS. 5A to 5H are diagrams illustrating display screens in creative assist mode processing of FIGS. 4A to 4B.

FIG. 5A shows an initial screen in the creative assist mode. On the display unit 101, information indicating various shooting conditions (shooting settings) as OSDs (display items) are displayed in a superimposed manner on a through-the-lens image 500 for user confirmation. The following icons, which indicate setting values for setting items unique to the creative assist mode, are displayed as information that can be set in the shooting settings. A background blurring amount icon 502, a brightness icon 503, a contrast icon 504, a vividness icon 505, a tint icon 506, and a monochrome setting icon 507. The numerical values displayed beside the icons 502 to 507 are the current setting values for the setting items indicated by the icons. Also, an electronic dial effective display 501 is displayed beside one of the icons 502 to 507. The electronic dial effective display 501 indicates setting items whose setting value can be changed by operating the electronic dial. In the example shown in the drawings, the electronic dial effective display 501 is displayed next to the background blurring amount icon 502, and therefore the user can confirm that it is possible to change the setting value for the background blurring amount by operating the electronic dial at that time. Shooting information 508 is an icon indicating the current setting and state of the digital camera 100, and displays the remaining battery amount, recorded image quality (compression rate and image size), and the remaining number of possible shots, in the stated order starting from the left. If the SET button included in the operation units 104 is pressed in the state shown in FIG. 5A, a quick setting screen in the creative assist mode, such as that shown in FIGS. 5B to 5H, is displayed.

Figure 5B:
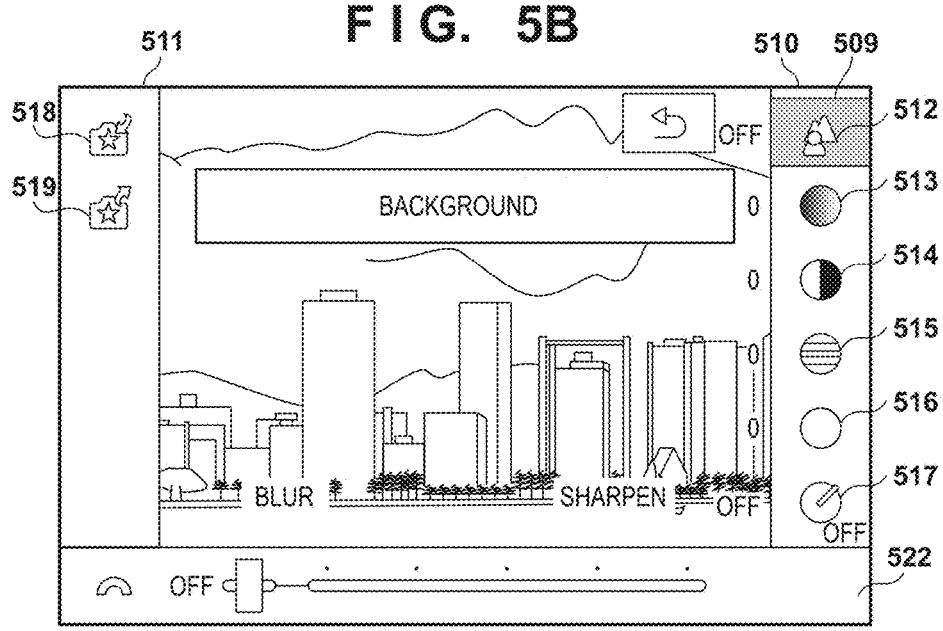

FIG. 5B shows a case in which a background blurring amount setting item has been selected on the quick setting screen in the creative assist mode. On the quick setting screen, in a superimposed manner on the through-the-lens image, the word "background" is displayed in the center of the screen, a right item column 510 and a left item column 511 are displayed on the sides of the screen, and a background blurring amount setting region 522 for performing settings related to the selected setting item is displayed in the lower part of the screen. Similarly to FIG. 5A, a background blurring amount icon 512, a brightness icon 513, a contrast icon 514, a vividness icon 515, a tint icon 516, and a monochrome setting icon 517 are displayed in the right item column 510. A setting registration icon 518 and a setting loading icon 519 are displayed in the left item column 511. A cursor 509 is displayed on any one of the icons 512 to 519. The user can move the cursor by operating the up and down buttons included in the operation units 104 so as to select one of the icons 512 to 519. Note that the items displayed in the right item column 510 and the left item columns 511 are in the same hierarchical level. That is to say, the cursor 509 moves to the setting registration icon 518 arranged in the uppermost part of the left item column 511 when the down button is pressed in a state where the cursor 509 is at the monochrome setting icon 517 arranged in the lowermost part of the right item column 510. On the contrary, the cursor 509 moves to the monochrome setting icon 517 arranged in the lowermost part of the right item column 510 when the up button is pressed in a state where the cursor 509 is at the setting registration icon 518 arranged in the uppermost part of the left item column 511. In FIG. 5B, the background blurring amount icon 512 is selected, and therefore the background blurring amount setting region 522 for setting the background blurring amount is displayed in the lower part of the screen. The background blurring amount can be set to OFF, or any setting value from 0 to 5.

Figure 5C:
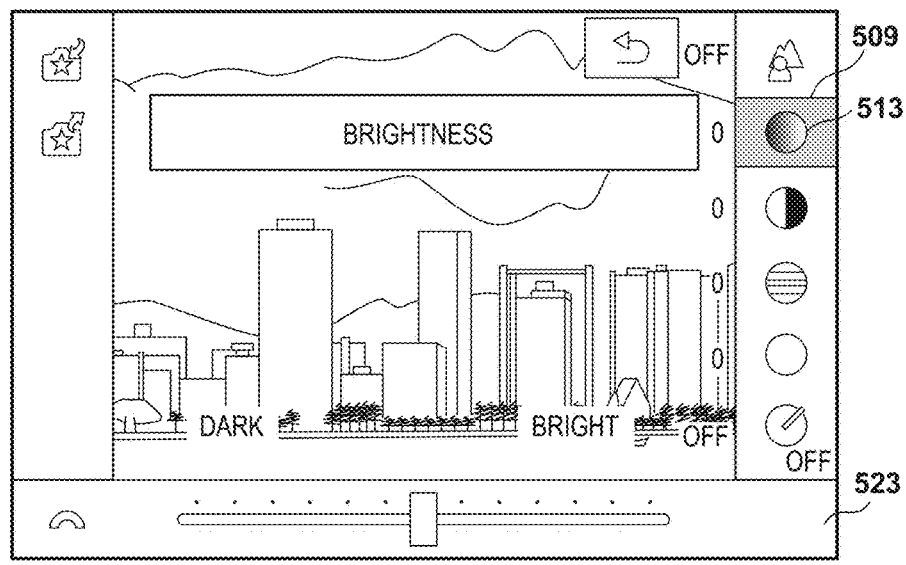

FIG. 5C shows a case in which the brightness icon 513 has been selected on the quick setting screen in the creative assist mode. On the screen shown in FIG. 5C, in a superimposed manner on the through-the-lens image, the word "brightness" is displayed in the center of the screen, and a brightness setting region 523 for setting the brightness is displayed in the lower part of the screen.

Figure 5D:
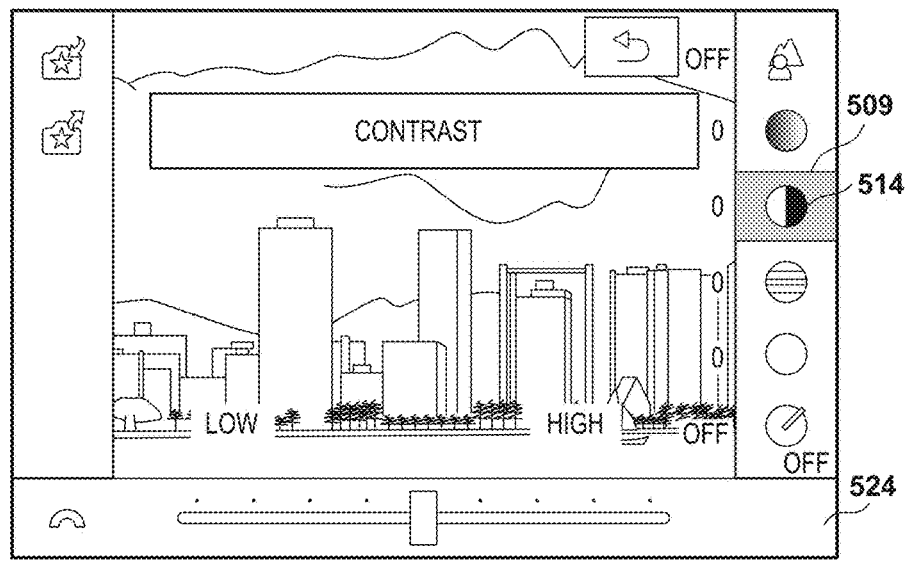

FIG. 5D shows a case in which the contrast icon 514 has been selected on the quick setting screen in the creative assist mode. On the screen shown in FIG. 5D, in a superimposed manner on the through-the-lens image, the word "contrast" is displayed in the center of the screen, and a contrast setting region 524 for setting the contrast is displayed in the lower part of the screen.

Figure 5E:
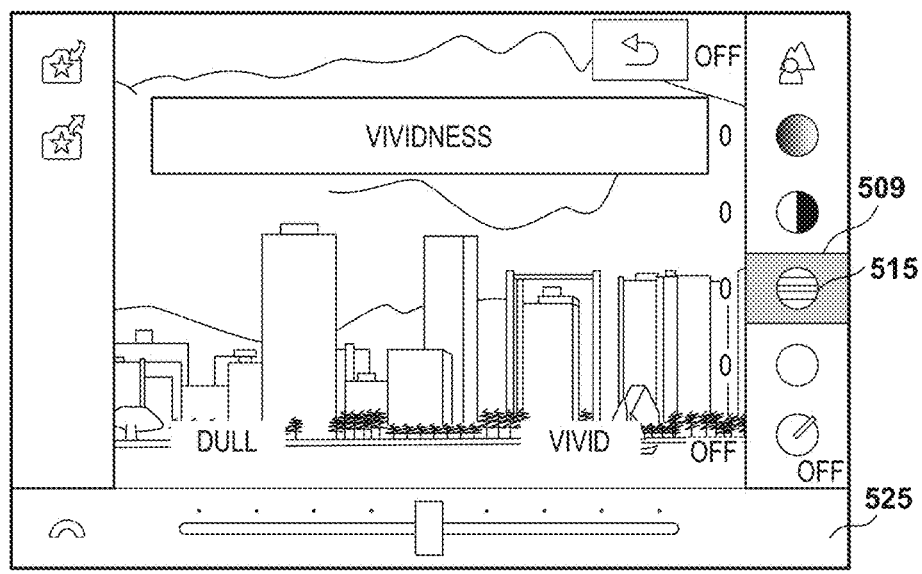

FIG. 5E shows a case in which the vividness icon 515 has been selected on the quick setting screen in the creative assist mode. On the screen shown in FIG. 5E, in a superimposed manner on the through-the-lens image, the word "vividness" is displayed in the center of the screen, and a vividness setting region 525 for setting the vividness is displayed in the lower part of the screen.

Figure 5F:
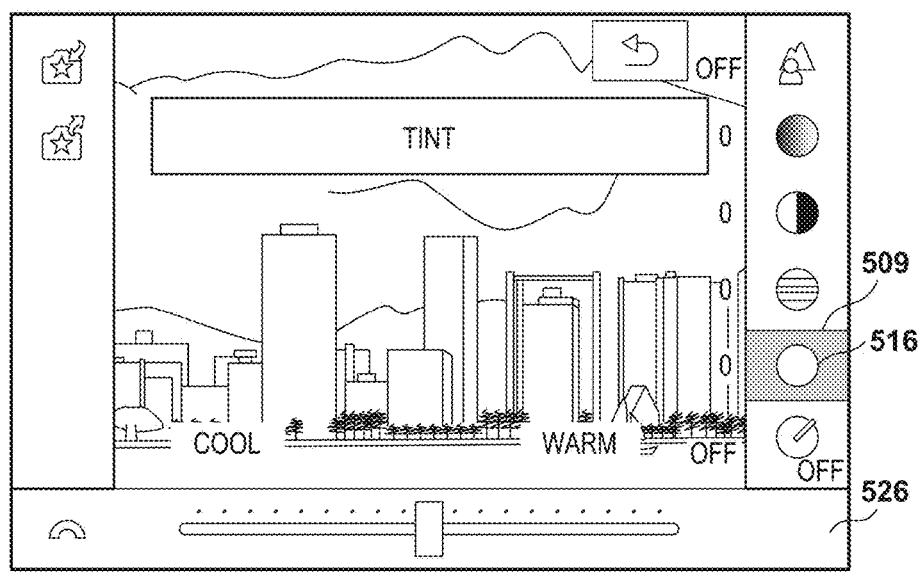

FIG. 5F shows a case in which the tint icon 516 has been selected on the quick setting screen in the creative assist mode. On the screen shown in FIG. 5F, in a superimposed manner on the through-the-lens image, the word "tint" is displayed in the center of the screen, and a tint setting region 526 for setting the tint is displayed in the lower part of the screen.

Figure 5G:
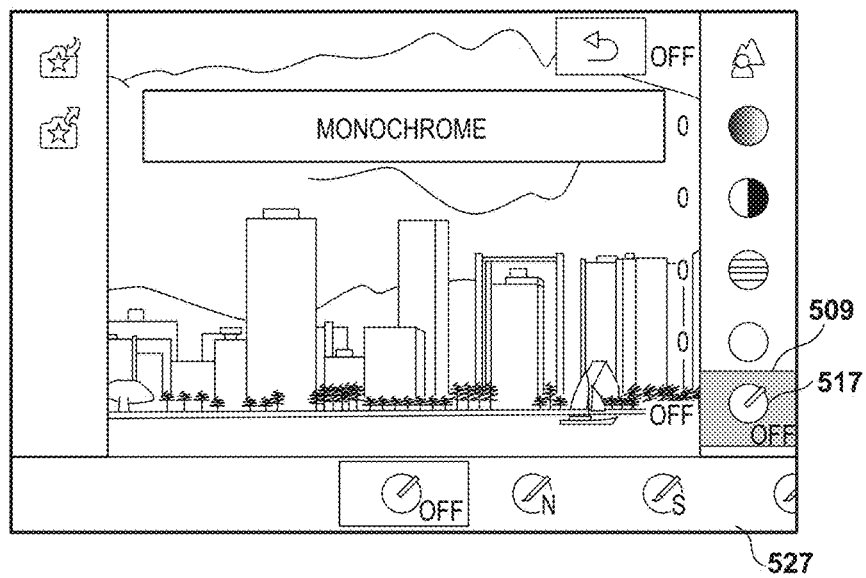

FIG. 5G shows a case in which the monochrome setting icon 517 has been selected on the quick setting screen in the creative assist mode. On the screen shown in FIG. 5G, in a superimposed manner on the through-the-lens image, the word "monochrome" is displayed in the center of the screen, and a monochrome setting region 527 for performing the monochrome setting is displayed in the lower part of the screen.

Figure 5H:
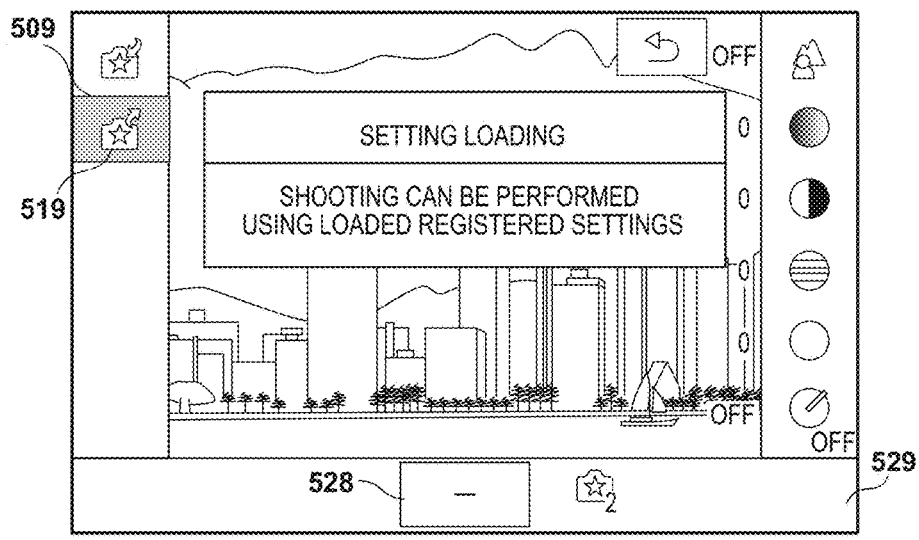

FIG. 5H shows a case in which the setting loading icon 519 has been selected on the quick setting screen in the creative assist mode. On the screen shown in FIG. 5H, in a superimposed manner on the through-the-lens image, the words "setting loading" and guidance describing the processing content are displayed in the center of the screen, and a loading selection region 529 for loading settings is displayed in the lower part of the screen. Registered setting patterns are displayed as options in the loading selection region 529, and by moving a selection frame 528, the user can select one of these options and load setting information. As shown in the table below, the items for setting the background blurring amount, brightness, tint, contrast, vividness, and monochrome, which can be set in the creative assist mode, are respectively associated with setting items such as the aperture value and the exposure correction value, which can be set in the applied shooting mode.

TABLE 1

| Creative Assist | | Applied Shooting Mode | |
| --- | --- | --- | --- |
| Background | OFF/1/2/3/4/5 | Aperture value | P-equivalent/F2.8/F4.0/F5.6/F8.0/F11 |
| Brightness | −9~0~+9 | Exposure correction value | −3~0~+3 in 1/3 increments |
| Tint | −9~0~+9 | WB correction | A9~0~B9 |
| Contrast | −4~0~+4 | Picture style Contrast | Standard −4~0~+4 |
| Vividness | −4~0~+4 | Picture style Color density | Standard −4~0~+4 |
| Monochrome | OFF/Black-and-white/Sepia/Blue/Purple/Green | Picture style Tone | OFF: standard Other: monochrome Tone: OFF (black-and-white)/Sepia/Blue/Purple/Green |

As in the table above, the setting items in the creative assist mode are such that the setting item names are expressed using ordinary language and do not use camera terminology, and the content of the setting items are also made easy to understand using icons. For this reason, even a beginner can easily enjoy creating pictures.

Figure 4B:
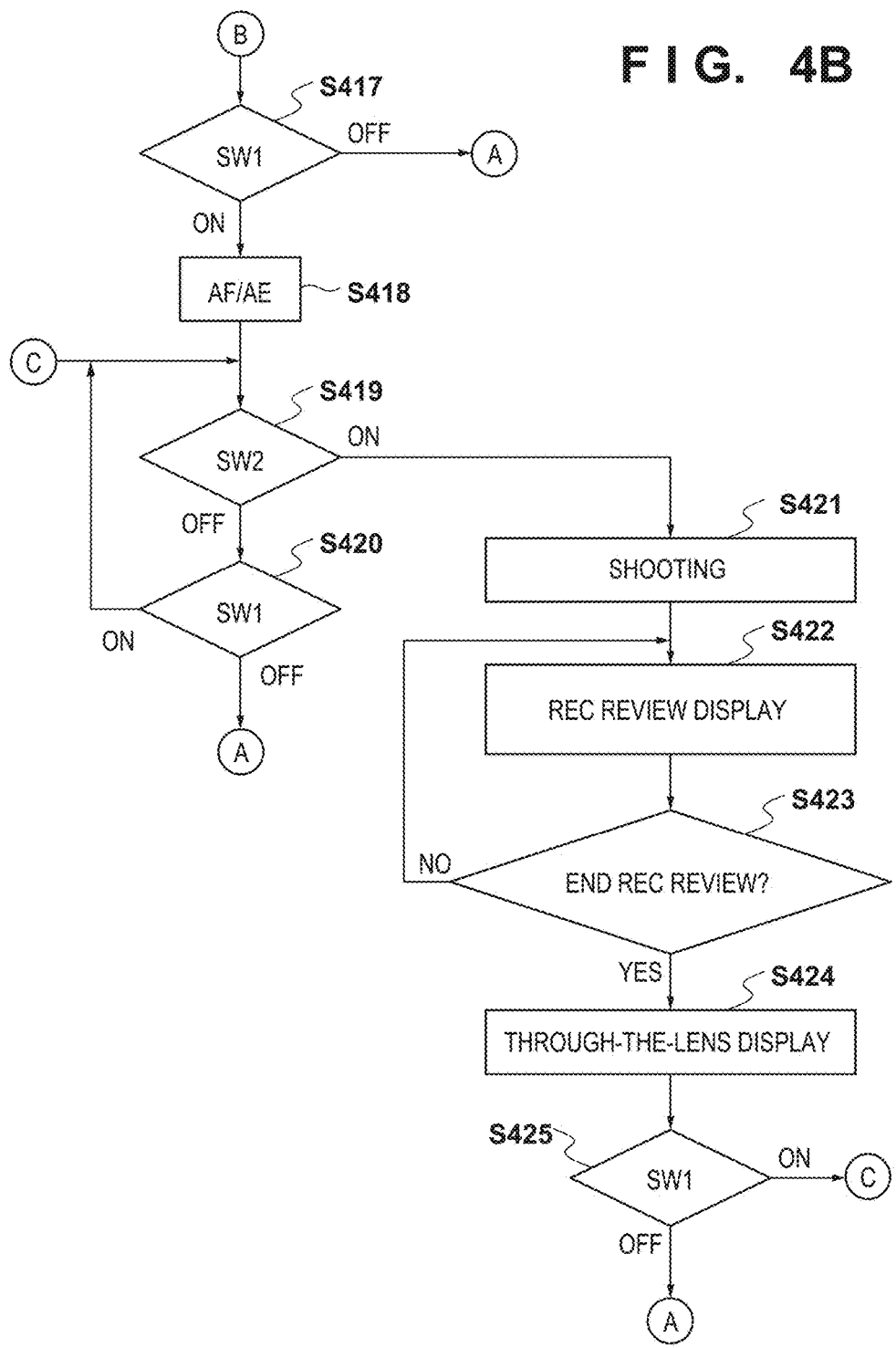

Next, a procedure of processing for the creative assist mode in step S305 of FIG. 3 will be described with reference to FIGS. 4A and 4B.

In step S400, the system control unit 201 displays the initial screen (FIG. 5A) on the display unit 101. On the initial screen, the quick setting screen can be displayed by the user pressing the SET button in the operation units 104. On the quick setting screen, the icons 502 to 507, 518, and 519 for the background blurring amount, brightness, contrast, vividness, tint, monochrome, setting registration, and setting loading can be selected by operating the up and down buttons. Also, the settings can be selected using the electronic dial, the control wheel 106, and the left and right buttons of the operation units 104. Selection can also be performed using a touch operation on the quick setting screen.

In step S401, the system control unit 201 determines whether or not the background blurring amount icon 512 has been selected on the quick setting screen with an above-described operation of the operation units 104. If the background blurring amount icon 512 has been selected, the processing moves to step S402.

In step S402, the system control unit 201 displays the blurring amount setting region 522 on the quick setting screen as shown in FIG. 5B and accepts an operation for setting the background blurring amount from the user. If "OFF" is selected as the setting value for the background blurring amount, automatic exposure control is performed using a program chart equivalent to that in the program AE mode. That is, the aperture and shutter speed are automatically set by the camera. If the background blurring amount is set to 1, the aperture is set to F2.8. If the background blurring amount is set to 2, the aperture is set to F4.0. If the background blurring amount is set to 3, the aperture is set to F5.6. If the background blurring amount is set to 4, the aperture is set to F8.0. If the blurring amount is set to 5, the aperture is set to F11. That is, when the background blurring amount is set, automatic exposure control that is similar to that in the aperture priority AE mode is performed. Also, with the setting of the background blurring amount, the system control unit 201 can check the depth of field in the through-the-lens display of the display unit 101 by controlling the aperture arranged in the shooting lens 203 or the shutter 204 according to the setting.

In step S403, the system control unit 201 determines whether or not the brightness icon 513 has been selected on the quick setting screen with an above-described operation of the operation units 104. If the brightness icon 513 has been selected, the processing moves to step S404.

In step S404, the system control unit 201 displays the brightness setting region 523 on the quick setting screen as shown in FIG. 5C and accepts a brightness setting operation from the user. If the brightness setting is changed using the operation units 104, the set brightness is reflected in the through-the-lens image of the display unit 101.

In step S405, the system control unit 201 determines whether or not the contrast icon 514 has been selected on the quick setting screen with an above-described operation of the operation units 104. If the contrast icon 514 has been selected, the processing moves to step S406.

In step S406, the system control unit 201 displays the contrast setting region 524 on the quick setting screen shown in FIG. 5D and accepts a contrast setting operation from the user. If the contrast setting is changed using the operation units 104, the set contrast is reflected in the through-the-lens image of the display unit 101.

In step S407, the system control unit 201 determines whether or not the vividness icon 515 has been selected on the quick setting screen with an above-described operation of the operation units 104. If the vividness icon 515 has been selected, the processing moves to step S408.

In step S408, the system control unit 201 displays the vividness setting region 525 on the quick setting screen as shown in FIG. 5E and accepts a vividness setting operation from the user. If the vividness setting is changed using the operation units 104, the set vividness is reflected in the through-the-lens image of the display unit 101.

In step S409, the system control unit 201 determines whether or not the tint icon 516 has been selected on the quick setting screen with an above-described operation of the operation units 104. If the tint icon 516 has been selected, the processing moves to step S410.

In step S410, the system control unit 201 displays the tint setting region 526 on the quick setting screen as shown in FIG. 5F and accepts a tint setting operation from the user. If the tint setting is changed using the operation units 104, the set tint is reflected in the through-the-lens image of the display unit 101.

In step S411, the system control unit 201 determines whether or not the monochrome setting icon 517 has been selected on the quick setting screen with an above-described operation of the operation units 104. If the monochrome setting icon 517 has been selected, the processing moves to step S412.

In step S412, the system control unit 201 displays the monochrome setting region 527 on the quick setting screen as shown in FIG. 5G and accepts a monochrome setting operation from the user. As shown in the chart above, the options for the monochrome settings are OFF (color)/black-and-white/sepia/blue/purple/green. If the monochrome setting is changed using the operation units 104, the set monochrome setting is reflected in the through-the-lens image of the display unit 101.

The settings for the setting values for the background blurring amount, brightness, contrast, vividness, tint, and monochrome, which are set based on user operations in steps S401 to S412 above are stored in the system memory 212 and stored in the non-volatile memory 213 as well. Accordingly, the settings are stored also when the power of the camera is turned off and then turned on again and the creative assist mode is selected. Also, the values that were most recently set in the creative assist mode at a previous time are stored also in the case where transition to another operation mode is made and the creative assist mode is selected again thereafter.

In step S413, the system control unit 201 determines whether or not the setting registration icon 518 has been selected on the quick setting screen with an above-described operation of the operation units 104. If the setting registration icon 518 has been selected, the processing moves to step S414, and setting registration processing is performed. The setting registration processing will be described later in detail with reference to FIGS. 6A and 6B.

In step S415, the system control unit 201 determines whether or not the setting loading icon 519 has been selected on the quick setting screen with an above-described operation of the operation units 104. Note that if none of the shooting settings have been registered, the setting loading icon 519 is grayed out and the setting loading icon 519 cannot be selected on the quick setting screen. If the setting loading icon 519 has been selected, the processing moves to step S416 and setting loading processing is performed.

In step S416, the system control unit 201 displays the loading selection region 529 on the quick setting screen as shown in FIG. 5H and accepts a setting loading operation. By moving the selection frame 528 using the electronic dial, controller wheel 106, or the left and right buttons of the operation units 104, one of the options that is displayed in the loading selection region 529 and indicates registered shooting settings can be selected. If one piece of setting information is selected, the system control unit 201 expands the shooting settings stored in the non-volatile memory 213 in the memory 210 and reflects them in the through-the-image display and the shooting information display of the display unit 101. If the SET button of the operation units 104 is pressed, the shooting settings that are currently selected in the loading selection region 529 are fixed, the memory 210 is updated with the fixed shooting settings, and the initial screen shown in FIG. 5A is returned to from the quick setting screen. Note that after the shooting settings are loaded, if the setting loading icon 519 is once again selected on the quick setting screen without any of the setting values (background blurring amount, brightness, contrast, vividness, tint, monochrome setting) in the creative assist mode being changed, the previously-used shooting settings will be selected by default (the focus will be on them) in the loading selection region 529. After the shooting settings are loaded, if one of the setting values in the creative assist mode is changed and then the setting loading icon 519 is selected on the quick selection screen, the default option or the most recently registered option is initially selected in the loading selection region 529, regardless of the option that was previously selected.

In step S417, the system control unit 201 determines whether or not the first shutter switch signal SW1 is on (shooting preparation instruction acceptance). If the first shutter switch signal SW1 is off, the processing returns to step S400, whereas if the first shutter switch signal SW1 is on, the processing moves to step S418.

In step S418, the system control unit 201 performs control such that shooting preparation operations such as AF and AE are performed. The shooting settings in this case are values corresponding to the setting values set using the above-described processing. For example, if the background blurring amount has been set, the shooting settings are set such that the aperture value corresponds to the set background blurring amount, and the shutter speed is determined so as to match the aperture value using AE.

In steps S419 and S420, the on/off states of the first shutter switch signal SW1 and the second shutter switch signal SW2 are determined. If it is determined that the second shutter switch signal SW2 is on while the first shutter switch signal is on, the processing moves to step S421. Also, if the first shutter switch signal SW1 is off (i.e., if the first shutter switch signal SW1 is turned off without the second shutter switch signal SW2 being turned on), the processing returns to step S400. Also, the processing of steps S419 and S420 is repeated while the first shutter switch signal SW1 is on and the second shutter switch signal SW2 is off.

In step S421, the system control unit 201 performs shooting processing that includes exposure processing and developing processing. Note that in the exposure processing, the image date obtained via the image capturing unit 205 and the A/D converter 206 is written into the memory 210 via the image processing unit 207 and the memory control unit 209, or directly from the A/D converter 206 via the memory control unit 209. Also, in the developing processing, the system control unit 201 uses the memory control unit 209 and the image processing unit 207 as needed to read out the image data written into the memory 210 and perform various kinds of processing. The setting values set for the above-described contrast, vividness, tint, and monochrome setting are reflected in color processing in the developing processing. Furthermore, the system control unit 201 performs recording processing for writing the image data obtained in the shooting processing in the recording medium 109 as an image file. In this case, information that indicates that shooting was performed in the creative assist mode and information that is used when shooting the image and indicates the setting values in the creative assist mode are also recorded in the recording medium 109 as the attribute information (meta-data) of the image file. The setting values for the creative assist mode are, in other words, the setting values set for the background blurring amount, brightness, contrast, vividness, tint, and monochrome setting. By recording the image file with this meta-data added, it is possible to reference the settings with which the image was shot when the image is reproduced later.

In step S422, the system control unit 201 reads out the image data obtained using the shooting processing from the memory 210 or the recording medium 109 and performs rec review display on the display unit 101.

In step S423, the system control unit 201 waits for the elapse of a pre-determined rec review time for rec review display and upon the elapse of the rec review time, the processing moves to S424.

In step S424, the system control unit 201 returns the display state of the display unit 101 from the rec review display to the through-the-lens display state. With this processing, the shot image data is checked using the rec review display, and thereafter the display state of the display unit 101 is automatically switched to the through-the-lens display state in which image data output from the image capturing unit 205 is displayed successively for the next shooting.

In step S425, the system control unit 201 determines the on/off state of the first shutter switch signal SW1, and if the first shutter switch signal SW1 is on, the processing moves to step S419, and if it is off, the processing returns to step S400. That is to say, if the half-pressed state of the shutter button 102 is maintained (the first shutter switch signal SW1 is on), the system control unit 201 prepares for the next shooting (step S419). On the other hand, if the shutter button 102 has been released (the first shutter switch signal SW1 is off), the series of shooting operations ends, and the shooting standby state is returned to (step S400).

Setting Registration Processing in Creative Assist Mode

Next, setting registration processing in step S414 of FIG. 4A will be described with reference to FIGS. 6A and 6B.

Figure 7A:
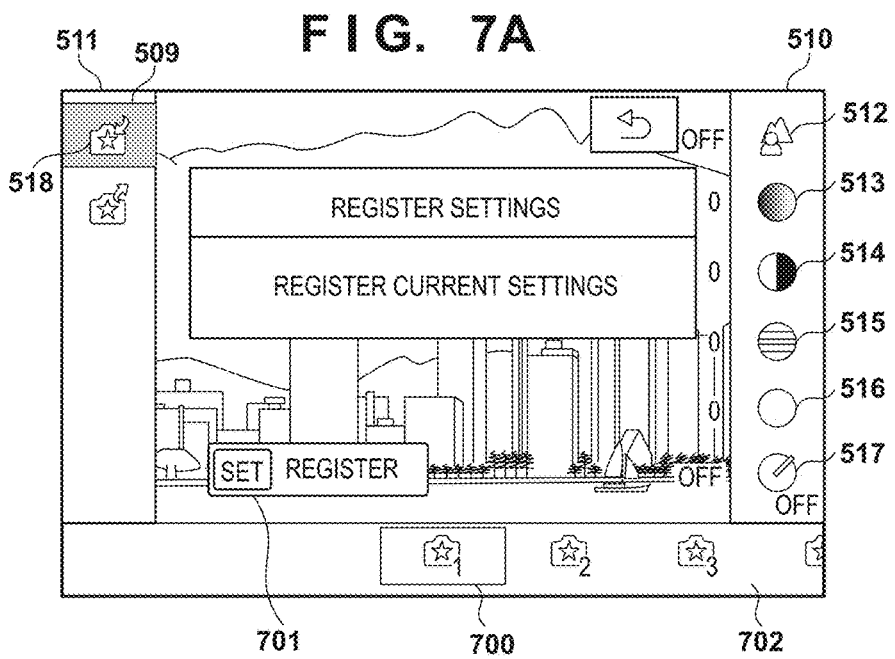
FIGS. 7A to 7F are diagrams illustrating display screens in setting registration processing of FIGS. 6A and 6B.

In step S600, the system control unit 201 displays a registration destination selection region 702, which corresponds to the setting registration icon 518 selected on the quick setting screen, as shown in FIG. 7A. There are six registration destination candidates, namely registration destinations 1 to 6. The user can select one of the registration destinations 1 to 6 displayed in the registration destination selection region 702 by moving the selection frame 700 with the electronic dial, the control wheel 106, and the left and right buttons of the operation units 104. Also, by pressing the SET button included in the operation units 104 when one of the registration destinations 1 to 6 is selected, the setting of the currently-selected content (the setting value of the background blurring amount, brightness, contrast, vividness, tint, or monochrome (hereinafter referred to as "creative settings") set as described with reference to FIG. 4A) is registered. In the example shown in FIG. 7A, the registration destination 1 is selected in the registration destination selection region 702. The setting values displayed on the left side of the icons 512 to 517, which are displayed in the right item column 510 in FIG. 7A, are the currently-set contents, and are the current creative settings that are to be registered at this time. A registration guide 701 indicates that the current creative settings can be registered in the currently-selected registration destination by pressing the SET button. Nothing is registered in the registration destinations 1 to 6 in the initial state, but if the user has performed registration to a registration destination in the past, creative settings (registered data) will already be registered therein. For this reason, if new creative settings are to be registered to a registration destination that has already been registered to, the already-existing registered content is erased, and the new creative settings are registered in its place.

In step S601, the system control unit 201 accepts an operation from the user for selecting one of the registration destinations 1 to 6 displayed in the registration destination selection region 702. One of the registration destinations is selected according to an operation of the left and right buttons or the controller wheel 106 of the operation units 104.

In step S602, the system control unit 201 checks the data stored in the non-volatile memory 213 to determine whether or not there is registered data for creative settings in the selected registration destination. If there is registered data, the processing moves to step S603, and if there is no registered data (nothing is registered in the selected registration destination), the processing moves to step S614.

In step S603, the system control unit 201 displays a comparison guide 703 on the display unit 101. The comparison guide 703 indicates that when the INFO button included in the operation units 104 is pressed, display using the creative settings registered in the selected registration destination can be performed for comparison with the current creative setting. In the example shown in FIG. 7B, the registration destination 2 is selected in the registration destination selection region 702. Since the comparison guide 703, which was not displayed when the registration destination 1 was selected, is displayed, it can be understood that other creative settings have already been registered in the registration destination 2.

In step S604, the system control unit 201 determines whether or not the INFO button of the operation units 104 was pressed, and if it was, the processing moves to step S605, and if not, the processing moves to step S608.

In step S605, the system control unit 201 causes the current creative settings that are to be registered to temporarily withdraw to (be stored in) the system memory 212. Then, the registered creative settings stored in the non-volatile memory 213 are read out to the system memory 212 and applied to the image processing in the image processing unit 207. By doing so, the through-the-lens image displayed on the display unit 101 reflects the registered creative setting. Accordingly, the user can look at the through-the-lens image to check what the image looks like when the creative settings that have already been registered in the currently-selected registration destination are applied. Accordingly, it is possible to compare the current creative settings that were applied to the through-the-lens image before the INFO button was pressed (the creative settings to be applied next) and the creative settings that have already been registered in the currently-selected registration destination (the creative settings that are to be overwritten and erased when a new registration is made). That is to say, before overwriting is performed, it is possible to judge whether or not it is really okay to erase the creative settings that are already registered. Note that both the through-the-lens image (live view image) display before step S605 and the through-the-lens image display in step S606 are performed in full-screen display (display in which the entire image fits in the display region, at a size such that the image and the display region match in the vertical or horizontal direction) in the display region of the display unit 101. By doing so, the effect of the applied shooting settings can be checked in greater detail. Also, changes in color before and after switching, and the like are easier to recognize since the display is switched using the same display region.

In step S606, the system control unit 201 determines whether or not the press of the INFO button in the operation units 104 was released, and if the INFO button was released (let go of), the processing moves to step S607, and if it is still being pressed, the display state in step S605 is continued. That is to say, while the INFO button is being pressed, the through-the-lens image is an image to which the shooting settings that have already been registered in the currently-selected registration destination have been applied.

In step S607, the system control unit 201 reads out the creative settings for before the press of the INFO button, which have been withdrawn to the system memory 212, and applies them to the image processing performed by the image processing unit 207. According to this, the through-the-lens image displayed on the display unit 101 is reverted back to one in which the current creative settings are reflected. By doing so, the setting content of the overwriting target can be reflected in the through-the-lens image and checked while the INFO button is being pressed. Note that the method for switching the display in this manner may also be a method other than a button operation. For example, it is possible to use a configuration in which switching is performed for a predetermined amount of time. Accordingly, switching display is possible using an image capturing apparatus with few operation members.

In step S608, the system control unit 201 determines whether or not the SET button included in the operation units 104 has been pressed, and if it has, the processing moves to step S610, and if not, the processing moves to step S609.

In step S609, the system control unit 201 determines whether or not the menu button included in the operation units 104 has been pressed. If the menu button has been pressed, the ending processing of step S620 is performed so as to end the display of the quick setting screen, and if the menu button has not been pressed, the processing returns to step S601.

Figure 7B:
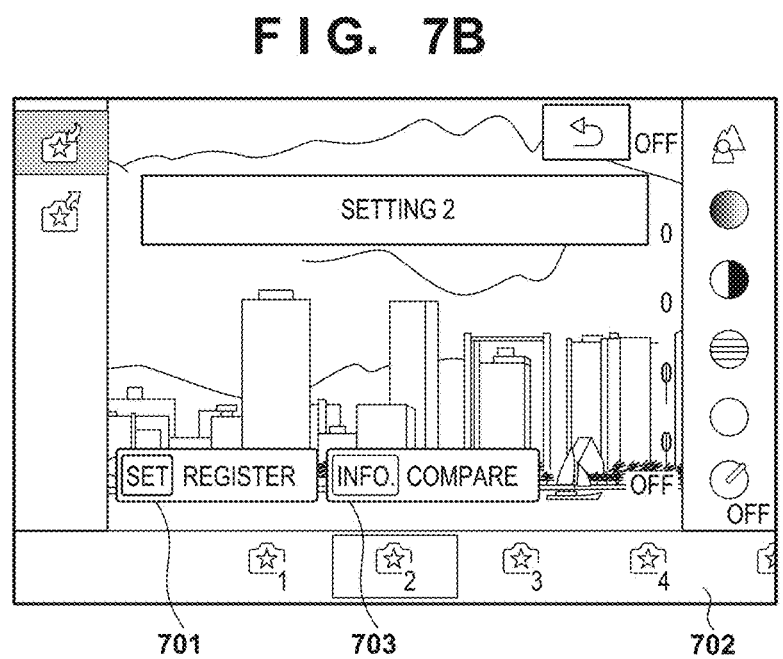
Figure 7C:
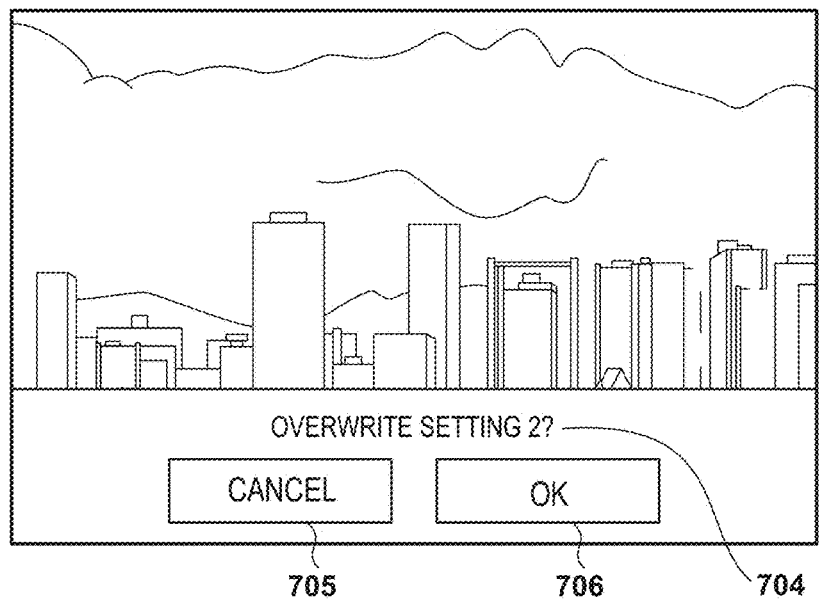

In step S610, the system control unit 201 displays an overwriting confirmation screen as shown in FIG. 7C on the display unit 101. A cancel button 705 and an OK button 706 are displayed on the overwriting confirmation screen along with a message 704 asking whether or not it is okay to perform overwriting in the selected registration location. The current creative settings to be registered are applied to the through-the-lens image in the background. One of the cancel button 705 and the OK button 706 can be selected, and if the cancel button 705 is selected by the user and the SET button is pressed, the display of the quick setting screen is ended without registering the current creative settings in the currently-selected registration destination. If the OK button 706 is selected by the user and the OK button is pressed, the creative settings that are already registered in the currently-selected registered destination is erased, and the new creative settings are registered.

In step S611, the system control unit 201 determines the on/off state of the first shutter switch signal SW1, and if it is off, the processing moves to step S612, and if it is on, the processing moves to step S620, and the display of the quick setting screen is ended without performing creative setting registration. By doing so, it is possible to immediately perform shooting with the current creative settings, and shooting can be performed while settings are being performed without missing a photo opportunity.

In step S612, the system control unit 201 determines whether or not the OK button 706 has been selected on the overwriting confirmation screen shown in FIG. 7C and the SET button has been pressed. If the OK button 706 has been selected and the SET button has been pressed, or in other words, if an overwriting execution instruction has been given, the processing moves to step S613. If the cancel button 705 has been selected and the SET button has been pressed, the processing moves to step S620 without the creative settings being reflected, and the display of the quick setting screen is ended.

In step S613, the system control unit 201 registers the current creative settings in the selected registration destination. That is to say, the current creative settings are recorded in the non-volatile memory 213 in association with the selected registration destination. The previous creative settings that were registered until immediately before the processing of step S613 are updated by overwriting.

Note that in step S602, if there is no registered data on the creative settings in the selected registration destination (nothing has been registered in the selected registration destination), the processing moves to step S614.

The processing of steps S614 and S615 is the same as that of steps S608 and S609.

Figure 7D:
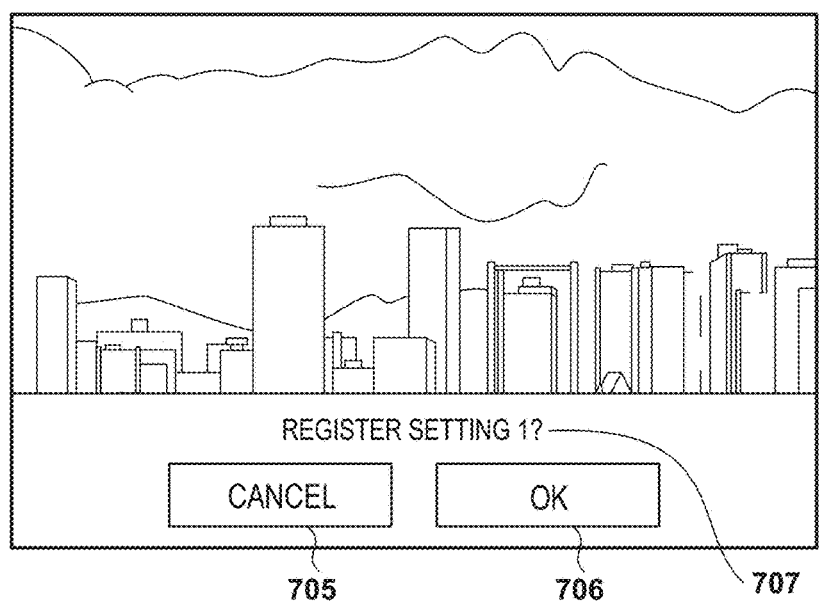

In step S616, the system control unit 201 displays a registration confirmation screen as shown in FIG. 7D on the display unit 101. The registration confirmation screen is similar to FIG. 7C, other than the fact that a message 707 asking whether or not it is okay to register the new creative settings in the selected registration destination is displayed in the registration destination selection region 702.

Steps S617 and S618 are similar to steps S611 and S612.

In step S619, the system control unit 201 newly registers the creative settings in the non-volatile memory 213 in association with the selected registration destination.

In step S620, the system control unit 201 performs processing for ending the display of the quick setting screen and ends the setting registration processing.

As described above, by reflecting the settings that are already registered in the through-the-lens image when registering a new shooting setting, it is possible to easily compare the images before and after the settings are changed. By doing so, the user can judge whether or not to perform overwriting while checking the effect of applying the current setting and the setting that is already registered using the through-the-lens image.

Note that in step S601, it is possible to use a configuration in which open registration destinations are provided with priority to the user. For example, if the setting registration icon 518 is selected on the quick setting screen, control is performed such that the cursor is first located on (initially focuses on) an open registration destination in which no creative settings are set, in the registration destination selection region 702. By doing so, it is possible to efficiently perform setting in an open registration location.

Also, if there is no open registration destination, a configuration may be used in which, among the registration destinations, a registration destination in which the date/time at which the creative settings were registered is old or a registration destination with a low usage frequency is provided with priority to the user. For example, if the setting registration icon 518 is selected on the quick setting screen, control is performed such that the cursor is first located on (initially focuses on) a registration destination in which the date/time at which the creative settings were registered is old or a registration destination with a low usage frequency, in the registration destination selection region 702. Alternatively, the registration destinations serving as options in the registration destination selection region 702 are aligned in order of how old the registration date/time is, or how low the usage frequency is. By doing so, the registration destinations may be provided as overwriting targets, starting with settings that are not used much.

Figure 6B:
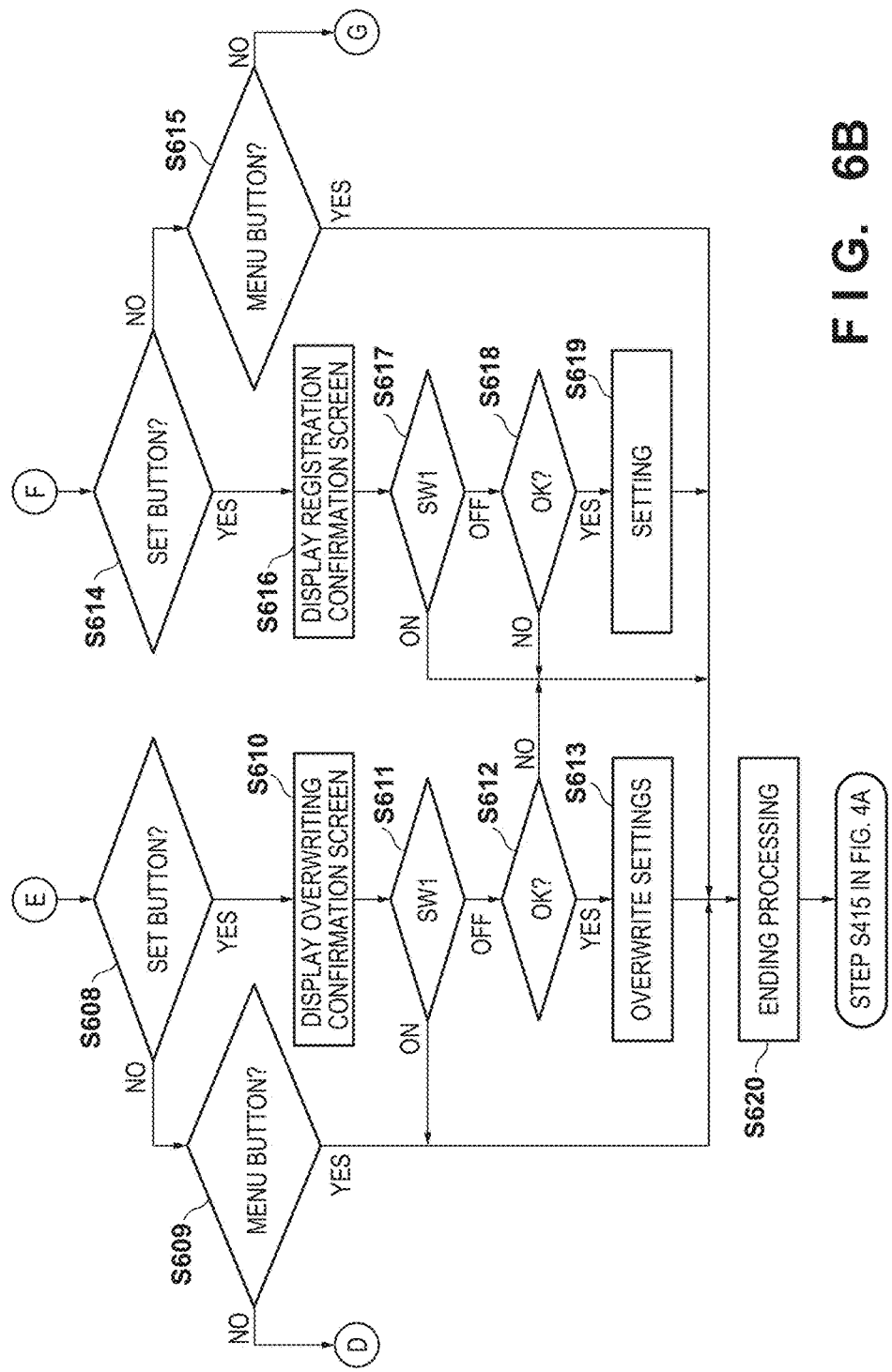
Figure 7E:
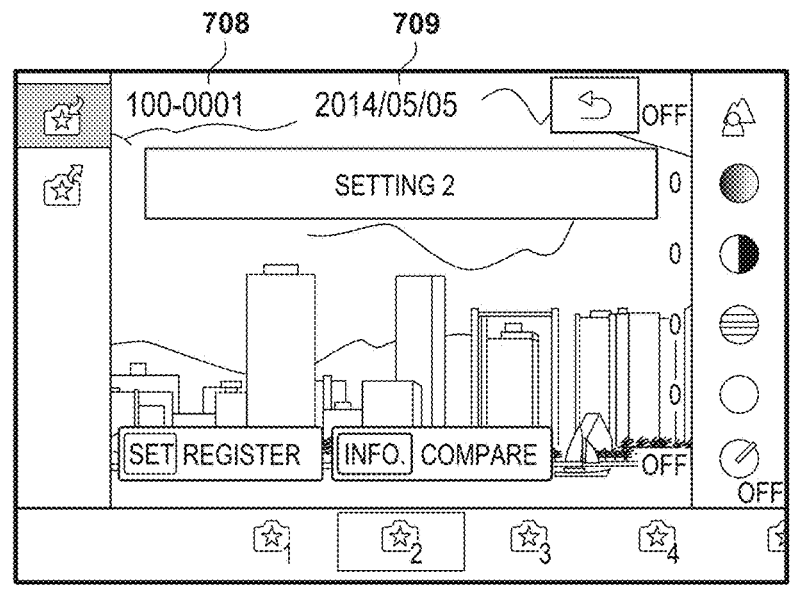

FIG. 7E shows a display example other than the comparison display (display of the through-the-lens image to which the creative settings that have already been registered in the selected destination are applied) in FIG. 7B in step S605. In FIG. 7E, a file number 708 and a shooting date/time 709 are also displayed. As will be described later, the registration of the creative settings can be set from a reproduced image instead of using the method of adjusting various setting items on the quick setting screen while a through-the-lens image is displayed as described with reference to FIGS. 6A and 6B. The file number 708 and the shooting date/time 709 indicate the file number and shooting date/time of the original reproduced image for which the creative settings are to be registered. By performing this kind of display, the user can judge which image was used as the basis in registering the creative settings undergoing comparison display, and thus it is possible to judge whether or not it is okay to perform overwriting on the creative settings being compared.

Figure 7F:
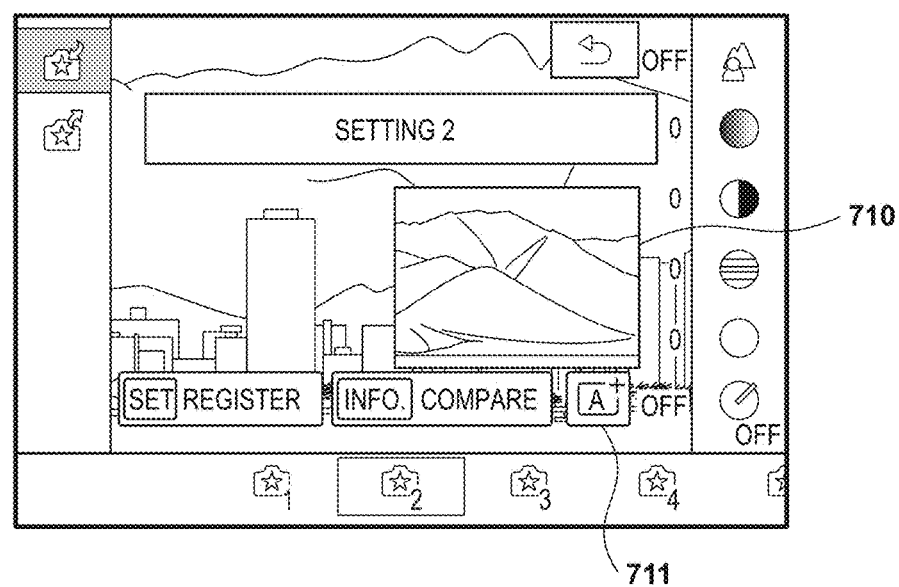

FIG. 7F shows another display example other than the comparison display (display of the through-the-lens image to which the creative settings that have already been registered in the selected destination are applied) in FIG. 7B in step S605. In FIG. 7F, a shot image 710 with the original shooting settings and a shooting scene 711 (a scene automatically identified by the digital camera 100) for when the shot image 710 is shot are displayed. By performing this kind of display, the user can judge which type of image and which type of scene are to be shot using the registered creative settings undergoing comparison display, and thus it is possible to judge whether or not to perform overwriting. For example, the following kinds of shooting scenes are included. A scene identified according to the brightness at the time of being shot, a blue-sky scene identified using blue sky recognition at the time of being shot, a person shooting scene identified using face recognition at the time of being shot, and a macro shooting scene identified based on the focus distance at the time of being shot.

As described above, by actively using the entirety of the display unit 101 to display the through-the-lens image, comparison of the shooting settings can be performed easily. Also, by switching and applying effects to the same image, it is easier for the user to judge whether or not to overwrite the shooting settings. Note that in the above-described example, an example was described in which, before new shooting settings (creative settings) are registered, a live view image in which the registered shooting settings are reflected and a live view image in which the new shooting settings are reflected are compared by performing switching therebetween, but there is no limitation to this. It can also be applied to when image processing parameters to be applied to an image undergoing reproduction display are to be registered during reproduction display of an image. For example, when a pattern for development parameters of a RAW image is to be newly registered, a pattern for development parameters that are already registered is selected, and according to an operation, it is possible to switch between display of images developed with the new pattern and the registered pattern applied to the same image.

Processing in Reproduction Mode

Next, reproduction mode processing in step S308 of FIG. 3 will be described with reference to FIGS. 8A and 8B.

In step S800, the system control unit 201 loads the most recent image data from the recording medium 109 using the most recent image information as a basis, and displays an initial screen (FIG. 9A) on the display unit 101.

In step S801, the system control unit 201 determines whether or not an image scrolling operation of the operation units 104 has been performed, and if an image scrolling operation has been performed, the processing moves to step S802, and if not, the processing moves to step S805. The image scrolling operation is a press of the right or left button included in the operation units 104, a rotation operation of the controller wheel 106, or the like.

In steps S802 and S803, the system control unit 201 loads the next image (image file) to be displayed and the attribute information of that image from the recording medium 109.

In step S804, the system control unit 201 displays the image loaded in step S803.

In step S805, the system control unit 201 determines whether or not there has been an operation of a delete button included in the operation units 104, and if there has been an operation of the delete button, the processing moves to step S806, and if not, the processing moves to step S808.

In step S806, the system control unit 201 erases the currently-displayed image (file) from the recording medium 109.

In step S807, the system control unit 201 loads the image to be displayed subsequent to the deleted image and displays it on the display unit 101.

In step S808, the system control unit 201 determines whether or not the SET button included in the operation units 104 has been pressed, and if it has, the processing moves to step S809, and if not, the processing moves to step S810. The reproduction quick setting of step S809 will be described later in detail with reference to FIG. 10.

In step S810, the system control unit 201 determines whether or not there has been an operation of the INFO button included in the operation units 104, and if there has been an operation of the INFO button, the processing moves to step S811, and if not, the processing moves to step S819.

In step S811, the system control unit 201 determines whether or not the reproduction information display is displayed normally (FIG. 9A), and if it is displayed normally, the processing moves to step S812, and if not, the processing moves to step S813.

Figure 9A:
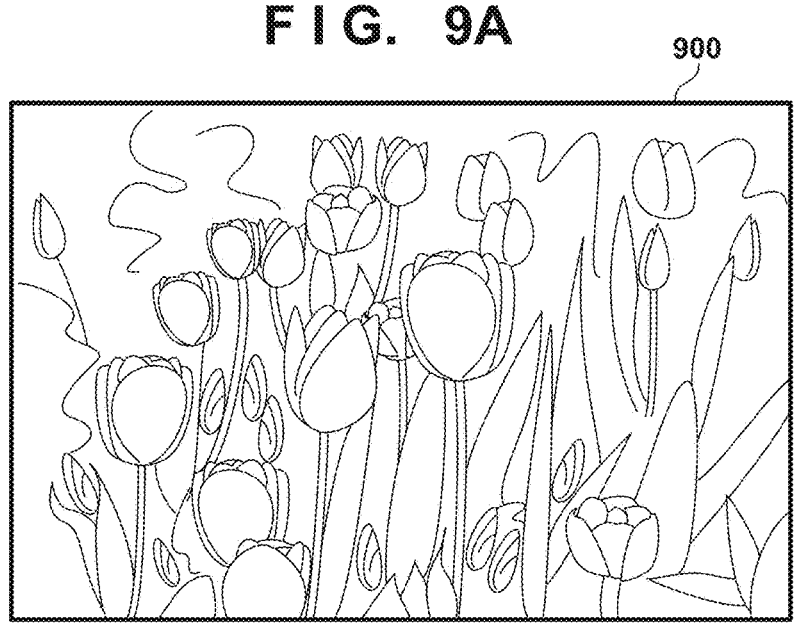
FIGS. 9A to 9H are diagrams illustrating display screens in reproduction mode processing of FIGS. 8A and 8B.
Figure 9B:
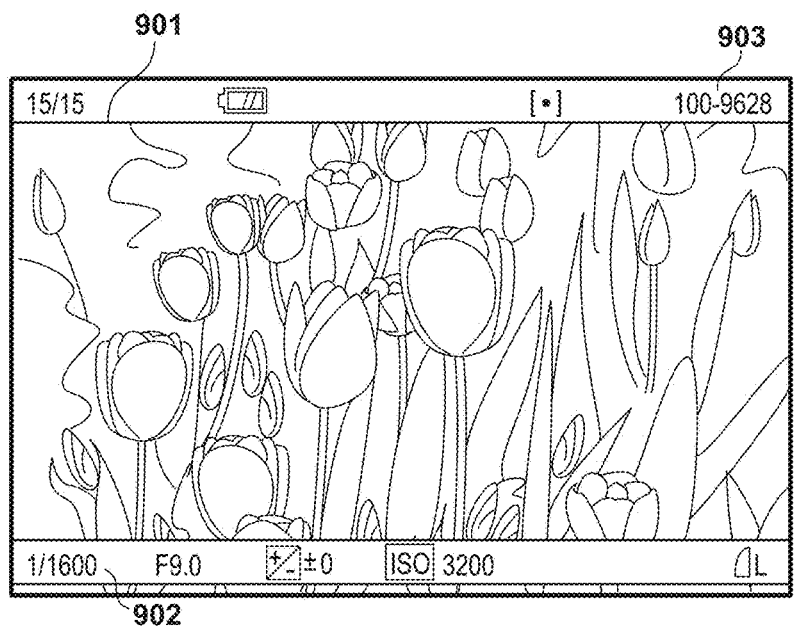

In step S812, the system control unit 201 switches the reproduction information display of the display unit 101 to a simple display (FIG. 9B).

In step S813, the system control unit 201 determines whether or not the reproduction information display is a simple display (FIG. 9B), and if it is a simple display, the processing moves to step S814, and if not, the processing moves to step S817.

In step S814, the system control unit 201 determines whether or not the image being reproduced based on the attribute information of the image loaded in step S803 (the image currently being displayed on the display unit 101) is an image that was shot in the creative assist mode (hereinafter referred to as a creative assist image). If it is determined that it is a creative assist image, the processing moves to step S815, and if not, the processing moves to step S816.

Figure 9C:
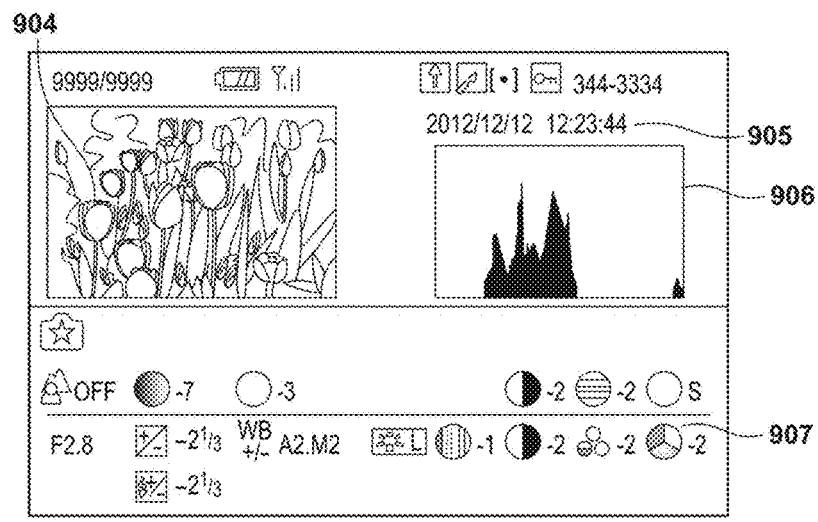

In step S815, the system control unit 201 switches the reproduction information display of the display unit 101 to a creative assist detail display (FIG. 9C).

Figure 9D:
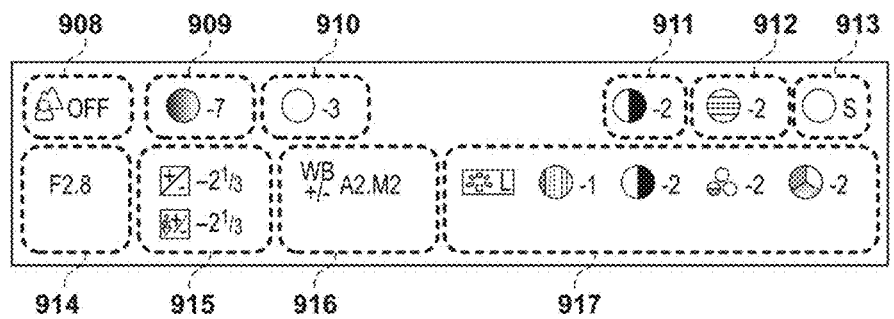
Figure 9E:
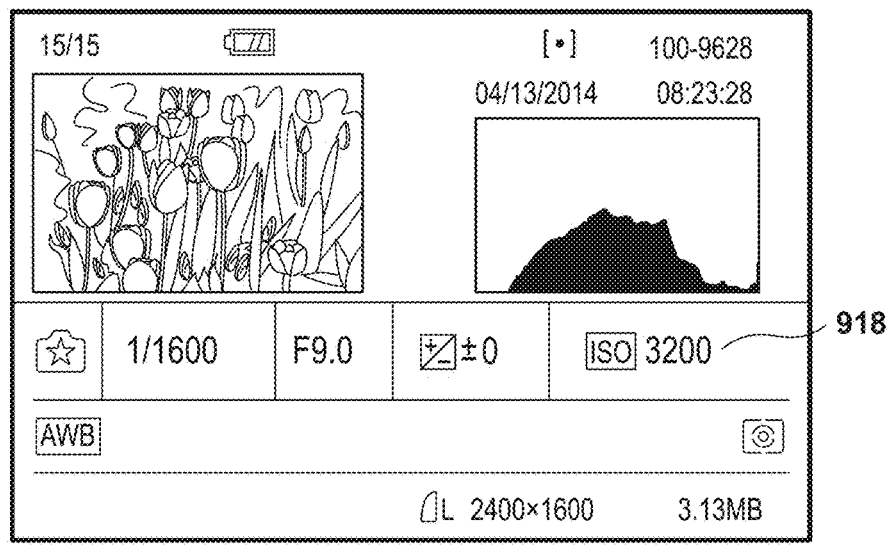

In step S816, the system control unit 201 switches the reproduction information display of the display unit 101 to a detailed display (FIG. 9E).

In step S817, the system control unit 201 determines whether or not the reproduction information display is a creative assist detailed display (FIG. 9C), and if it is a creative assist detailed display, the processing moves to step S816, and if not, the processing moves to step S818.

In step S818, the system control unit 201 switches the reproduction information display of the display unit 101 to a normal display (FIG. 9A).

In step S819, the system control unit 201 determines whether or not there was an operation other than reproduction, and if there was an operation other than reproduction, the processing moves to step S820, and if not, the processing moves to step S821.

In step S820, the system control unit 201 performs processing corresponding to operation input other than that described above. For example, operation input other than that described above is image editing processing, switching to multi-reproduction, menu display using a menu button, and the like. Note that multi-reproduction is a mode in which multiple reduced images of image data are displayed in alignment in one screen of the display unit 101.

In step S821, the system control unit 201 determines whether or not an ending operation or a first shutter switch SW1 operation was performed, and if an operation was performed, the reproduction mode is ended, and if not, the processing returns to step S801.

Screen in Reproduction Mode

Here, a screen displayed on the display unit 101 during the processing for the above-described reproduction mode will be described with reference to FIGS. 9A to 9G.

FIG. 9A shows an initial screen (normal display) for when a transition to the reproduction mode has been performed. An image 900 read out from the recording medium 109 undergoes reproduction display on the display unit 101.

FIG. 9B shows a simple display screen on which attribute information of the reproduced image is displayed simply. A numerical value 901 represents the relationship between the total number of files stored in the recording medium 109 and the currently-displayed image number. An image ID 903 represents the DCIM folder number and file number. Shooting information 902 is information indicating shooting setting values in the camera for when the image 900 was shot, and starting from the left, they are shutter speed, aperture, exposure correction value, and ISO sensitivity. These pieces of information are displayed based on the attribute information of the read-out image.

FIG. 9C shows a creative assist detail information display screen on which corresponding shooting settings for the applied shooting mode are displayed along with the creative settings that were set when shooting was performed in the creative assist mode. By performing this display, even a user who does not understand photograph terminology can check the correspondence between the simple shooting settings and the applied shooting settings. An image 904 (a compressed version of the image 900), shooting date/time 905, a brightness histogram display 906, and a comparison display 907 are displayed on the creative assist detail information display screen. The comparison display 907 displays a comparison of the creative settings and the shooting settings for the applied shooting mode.

FIG. 9D is an enlarged display of the comparison display 907 on the creative assist detail information display screen. A background setting 908, a brightness setting 909, a tint setting 910, a contrast setting 911, a vividness setting 912, and a monochrome setting 913 respectively indicate, among the creative settings for the time when the image being reproduced was shot, the setting values for the background blurring amount, brightness, tint, contrast, vividness, and the monochrome setting. An aperture value 914, an exposure correction value/dimming correction value 915, a white balance correction value (WB correction value) 916, and a picture style 917 respectively indicate values set in the camera according to the creative settings that were set when the image being reproduced was shot. These values indicate information for performing shooting in the same manner as with the creative settings in the applied shooting mode.

The background setting 908 and the aperture value 914 are settings that correspond to each other. Also, the brightness setting 909 and the exposure correction value/dimming correction value 915 are settings that correspond to each other. Furthermore, the tint setting 910 and the WB correction value 916 are settings that correspond to each other. Even further, the contrast setting 911, vividness setting 912, and monochrome setting 913 are settings to which the picture style 917 corresponds. That is to say, the setting of the picture style is a setting relating to image processing such as color processing. As shown in FIG. 9D, settings that correspond to each other are displayed in rows that are adjacent to each other in the same column in a matrix of shooting setting values. By displaying them in vertical alignment in the same columns in this way, the correspondence between the creative settings, which are expressed in simple terms, and settings in the applied shooting mode, which are expressed using camera terminology, can be easily understood. As a result, advancing to the applied shooting mode is easy for even a user who is not used to camera terminology.

Note that instead of aligning the related shooting settings vertically, they may be displayed in adjacent columns of the same row in a matrix (displayed horizontally adjacent to each other). Also, a configuration is possible in which corresponding settings are displayed in the same color and different colors are used for non-corresponding settings. Thus it is possible to clearly identify the correspondence relationships between the settings (makes them distinguishable).

FIG. 9E shows a detail information display screen 918 in which attribute information of a reproduced image is displayed in detail, and the shutter speed, aperture value, ISO sensitivity, exposure correction value, and the like that can be set in the applied shooting mode are displayed therein.

Figure 9F:
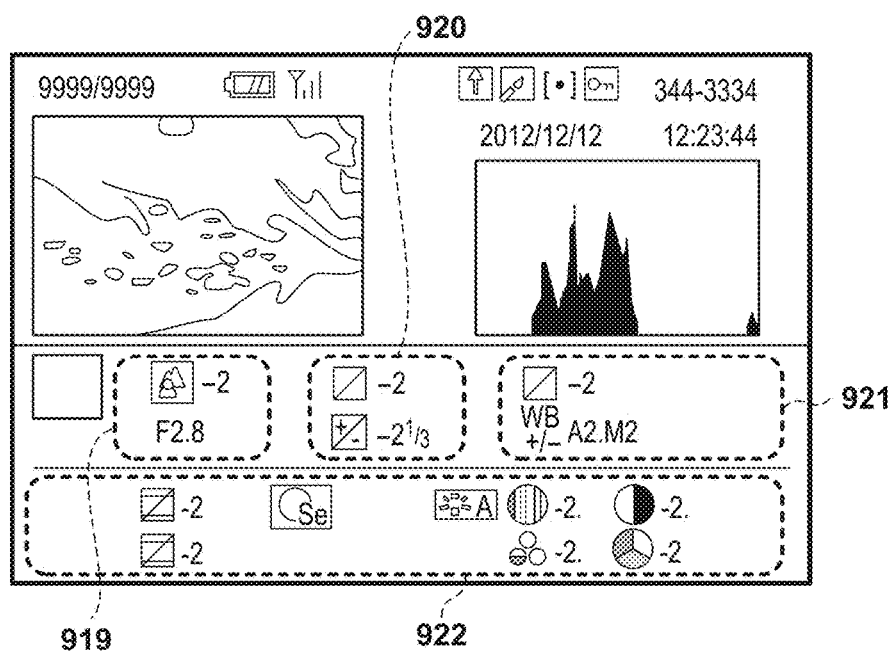

FIG. 9F shows another display mode 1 of the creative assist detail information display screen shown in FIG. 9C. In this screen, the creative settings and the settings in the applied shooting mode are associated using a method other than that in FIG. 9C. In the example shown in FIG. 9F, the correspondence relationships are shown by surrounding the corresponding settings with lines. That is to say, a frame 919 shows that the background setting and the aperture value correspond to each other, a frame 920 shows that the brightness and exposure correction value correspond to each other, a frame 921 shows that the tint and WB correction correspond to each other, and a frame 922 shows that the contrast, vividness, and monochrome and the picture style correspond to each other.

Figure 9G:
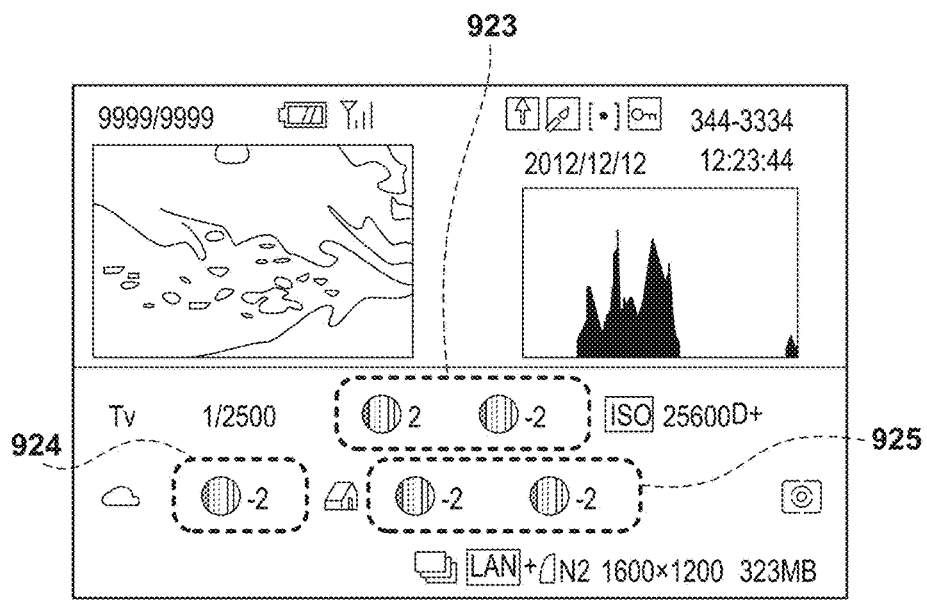
Figure 9H:
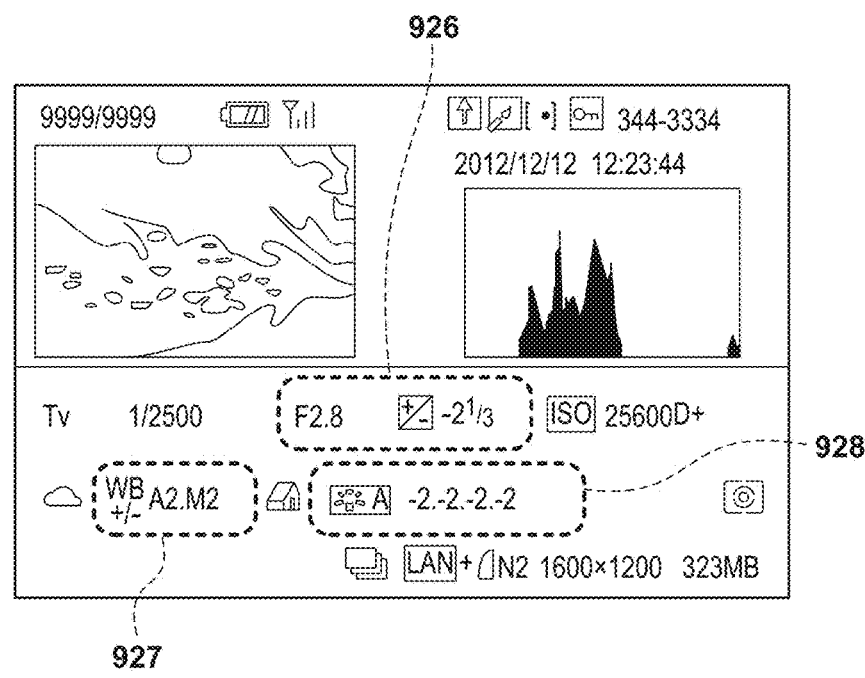

FIGS. 9G and 9H show another display mode 2 of the creative assist detail information display screen shown in FIG. 9C. On this screen, the correspondence relationship is shown by switching the display with corresponding settings at the same display positions (in regions where at least a portion overlaps). FIG. 9G is a screen showing setting values for the creative settings, in which the setting value for the brightness is displayed at the position of frame 923, the setting value for the tint is displayed at the position of frame 924, and the setting values for the contrast, vividness, and monochrome are displayed at the position of frame 925. The display of FIG. 9H is switched to if the user presses a button for switching while the screen shown in FIG. 9G is being displayed, or it is switched to automatically according to the elapse of a predetermined amount of time (about a few seconds). In FIG. 9H, the exposure correction value and the dimming correction value are displayed at the position of a frame 926, the WB correction value is displayed at the position of a frame 927, and the picture style setting value is displayed at the position of a frame 928. Since the frame 923 and the frame 926, the frame 924 and the frame 927, and the frame 925 and the frame 928 are respectively at the same positions, it can be understood that the settings displayed respectively therein are in a correspondence relationship. For example, when the user presses the button for switching, or upon the elapse of a predetermined amount of time, the setting value for the brightness in the creative settings, which is displayed at the position of the frame 923, is switched to the exposure value and the dimming correction value, and it can be understood that they are in a correspondence relationship. Note that in response to the position of the setting that the user wants to switch being touched, instead of pressing a button for switching, it is possible to switch only the settings displayed at the touched position to the corresponding display. By doing so, it is possible to compare only the settings whose correspondence the user wants to check.

As described above, according to the processing of the reproduction mode of the present embodiment, it is possible to cause the camera to learn the shooting settings using the shooting setting information of an image shot in the creative assist mode. Specifically, even if the user does not understand camera terms set at the time of shooting, the user can easily check the corresponding shooting settings in the applied shooting mode at the same time as checking the understandable simple settings. By making it possible to learn using the creative settings in the reproduction mode, it is possible to learn how to shoot images (the meaning of setting items, how to set the setting items to shoot an image such as that being reproduced, etc.) using images shot by another user using another camera.

Reproduction Quick Setting Processing

Figure 10:
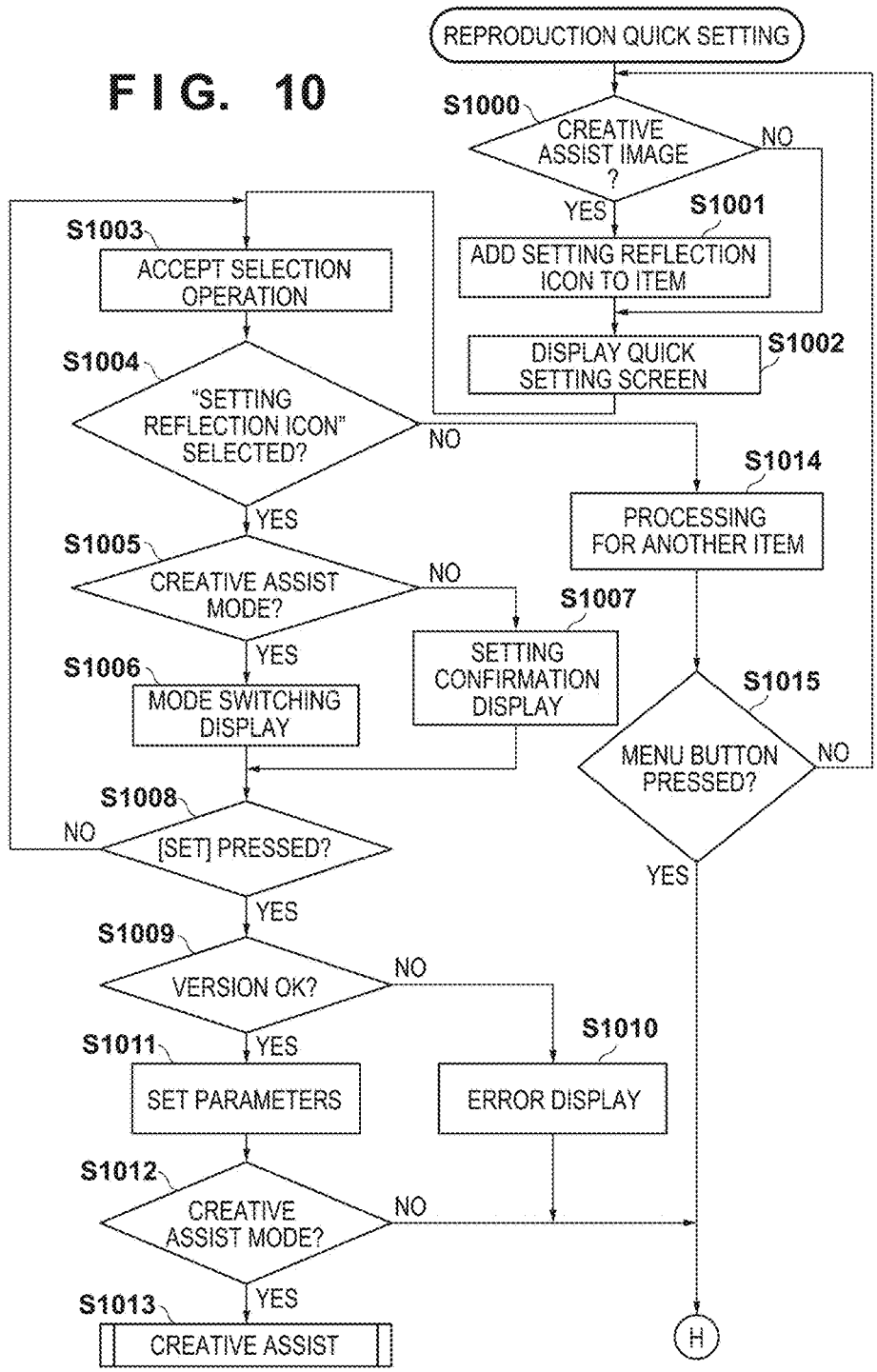
FIG. 10 is a flowchart showing quick setting processing in reproduction mode processing of FIGS. 8A and 8B.

Next, reproduction quick setting processing in step S809 of FIG. 8A will be described with reference to FIG. 10.

In step S1000, based on the attribute information of the image, the system control unit 201 determines whether or not the currently-displayed image is an image shot using creative assist (a creative assist image). If it is a creative assist image, the processing moves to step S1001, and if it is not a creative assist image, the processing moves to step S1002.

Figure 11A:
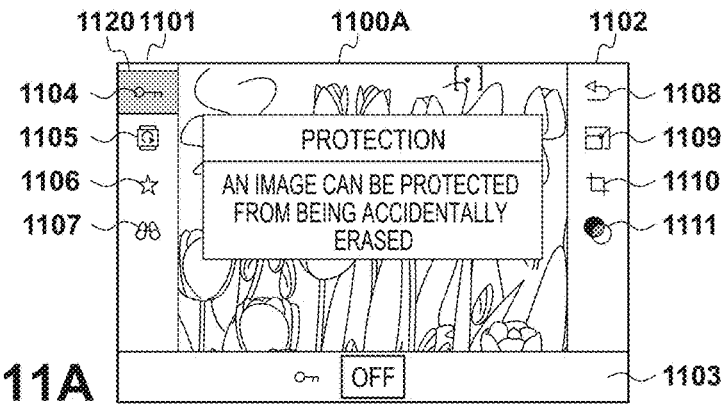
FIGS. 11A to 11C are diagrams illustrating display screens in quick setting processing of FIG. 10.
Figure 11B:
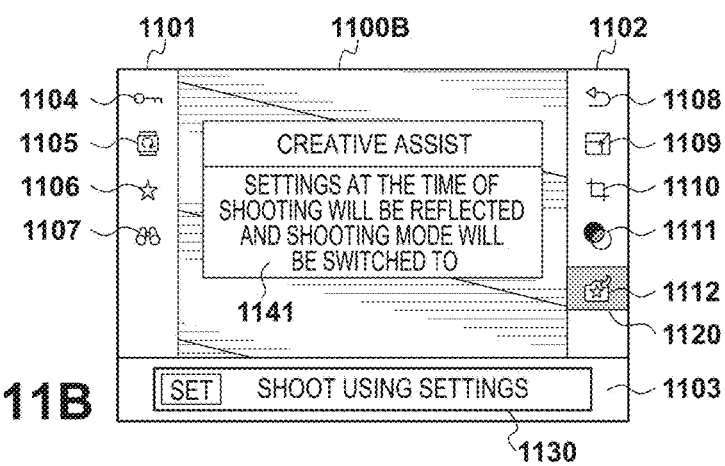

In step S1001, the system control unit 201 performs setting such that an item for reflecting in a creative assist setting (reflection icon 1130) is displayed on the reproduction quick setting screen shown in FIG. 11B.

In step S1002, the system control unit 201 displays the reproduction quick setting screen on the display unit 101. On the reproduction quick setting screen, the reflection icon 1130 is displayed in the case where the displayed image is a creative assist image (FIG. 11B) and the reflection icon 1130 is not displayed in the case where the displayed image is not a creative assist image (FIG. 11A).

FIG. 11A shows a reproduction quick setting screen in the case where the displayed image is not a creative assist image. A left item column 1101, a right item column 1102, and an item content display region 1103 are displayed in a superimposed manner on the reproduced image 1100A (which is not a creative assist image). Items that are options included in the same hierarchical level are displayed in the left item column 1101 and the right item column 1102. In the example shown in the drawing, as selectable items, a protection icon 1104, a rotation icon 1105, a favorites registration icon 1106, and a search icon 1107 are displayed in the left item column 1101, and a return icon 1108, a resize icon 1109, a trimming icon 1110, and a creative filter icon 1111 are displayed in the right item column 1102. A cursor 1120 is displayed on a selected item among these. In FIG. 11A, the protection icon 1104 has been selected.

Items subordinate to an upper-level item (in the example shown in the drawing, the protection icon 1104) selected in the left item column 1101 and the right item column 1102 are displayed in the item content display region 1103. The user selects one of the items displayed in the left-side item column 1101 and the right-side item column 1102 using the up button or the down button in the operation units 104. Also, by operating the electronic dial, the controller wheel 106, and the left and right buttons of the operation units 104, the processing content of the subordinate item displayed in the item content display region 1103, which corresponds to the selected upper-level item, is selected, and the processing can be performed by pressing the SET button. For example, if the user wants to resize an image being displayed, it is sufficient that the cursor 1120 is moved to the resize icon 1109 using the up and down buttons, a desired size is selected from among resized size candidates displayed in the item content display region 1103 using the left and right buttons, and the SET button is pressed.

FIG. 11B shows a reproduction quick setting screen in the case where the displayed image is a creative assist image 1100B. On the screen shown in FIG. 11B, a setting reflection icon 1112 is displayed in the right item column 1102 in addition to the items shown in FIG. 11A, and the reflection icon 1130 is displayed in the item content display region 1103. The setting reflection icon 1112 is a display item for giving an instruction to perform shooting settings based on attribute information of a displayed image (reproduced image).

In step S1003, the system control unit 201 accepts a movement operation of the cursor 1120 performed using the operation unit 104. Specifically, an operation of moving the cursor 1120 using the up and down buttons of the operation units 104 and selecting one of the items displayed in the left item column 1101 and the right item column 1102 is accepted.

In step S1004, the system control unit 201 determines whether or not the setting reflection icon 1112 has been selected, and if the setting reflection icon 1112 has been selected, the processing moves to step S1005, and if not, the processing moves to step S1014.

In step S1005, the system control unit 201 determines whether or not the mode switching button 103 is at the position of the creative assist mode, and if it is at the position of the creative assist mode, the processing moves to step S1006, and if not, the processing moves to step S1007. That is to say, the system control unit 201 determines whether or not the setting of the shooting mode (shooting mode setting) is a setting for the creative assist mode among the multiple shooting modes.

In step S1006, the system control unit 201 displays a message 1141 shown in FIG. 11B. If the SET button is pressed, the message 1141 is displayed in order to notify the user that it is possible to reflect the creative settings read out from the attribute information of the image currently being reproduced (creative settings used at the time of shooting the reproduced image) and switch to the shooting mode. In this case, if the SET button is pressed, the mode switching button 103 is at the position for the creative assist mode, and therefore a transition from the reproduction mode to the shooting mode is made. Accordingly, transition to the creative assist mode, which is one of the still image shooting modes, is made, and the creative settings read out from the attribute information of the image being reproduced can be reflected.

Figure 11C:
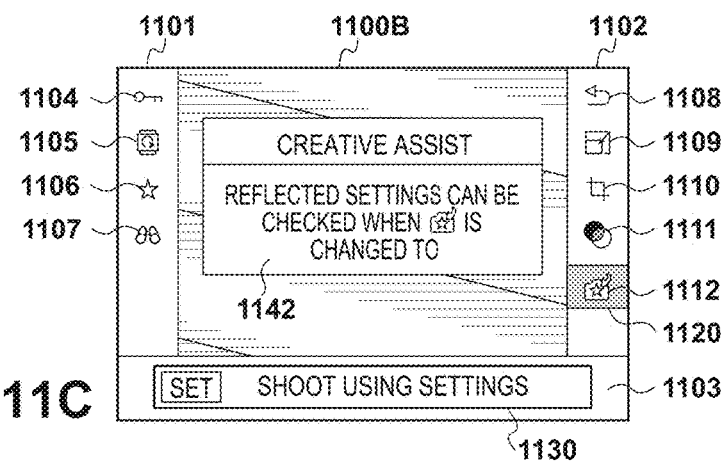

Also, in step S1007, the system control unit 201 displays a message 1142 shown in FIG. 11C. The message 1142 indicates that the creative settings read out from the attribute information of the image currently being reproduced will be reflected if an operation of pressing the SET button and thereafter performing setting to the creative assist mode, which is one of the shooting modes, is performed. If the mode switching button 103 is at a position other than that of the creative assist mode, the creative assist mode settings cannot be reflected, and therefore a method for reflecting the settings from the reproduced image is displayed with guidance. For example, if the mode switching button 103 is in auto mode, the aperture, shutter speed, color processing, and the like are set automatically based on the result of analyzing the through-the-lens image, or the like, and therefore the creative settings cannot be used as a reference. If the message 1142 is displayed in step S1007, the user needs to perform the following operation in order to perform shooting in which the creative settings read out from the attribute information of the image currently being reproduced are reflected. That is to say, the user performs an operation of pressing the SET button and making a transition to a shooting mode, and furthermore performs an operation of switching the mode switching switch 60 to the position for the creative assist mode.

In step S1008, the system control unit 201 determines whether or not the SET button included in the operation units 104 has been pressed, and if the SET button has not been pressed, the processing returns to step S1003, and if the SET button has been pressed, the processing moves to step S1009.

In step S1009, the system control unit 201 checks the version by checking the attribute information of the creative assist image, and if the version is OK, the processing moves to step S1011, and if the version is NOT OK, the processing moves to step S1010. That is to say, the system control unit 201 determines whether or not the creative settings obtained from the attribute information of the reproduced image are of a version that can be reflected in the digital camera 100. Since there is a possibility that it will not be possible to reflect future shooting settings accompanying the evolution of the shooting function, it is necessary to check the version. Checking the version can be performed using the model information of the camera that shot the image, which is obtained from the attribute information of the image, for example. If it is understood that the reproduced image was shot using a model of camera that can reflect creative settings stored in the non-volatile memory 213, it can be determined that the creative settings of the reproduced image are of a version that can be reflected in the digital camera 100.

In step S1010, the system control unit 201 performs error display on the display unit 101 to the effect that creative settings cannot be performed, stating "The shooting settings obtained from the image cannot be reflected".

In step S1011, the system control unit 201 stores the creative settings obtained from the attribute information of the currently-displayed creative assist image in the system memory 212 and the non-volatile memory 213. Thus, at least a part of the shooting settings from when the reproduced image was shot, which are obtained from the reproduced image, are set in the digital camera 100. Note that the setting values are stored here, but the setting values may be reflected after the transition to the shooting mode is made.

Figure 8A:
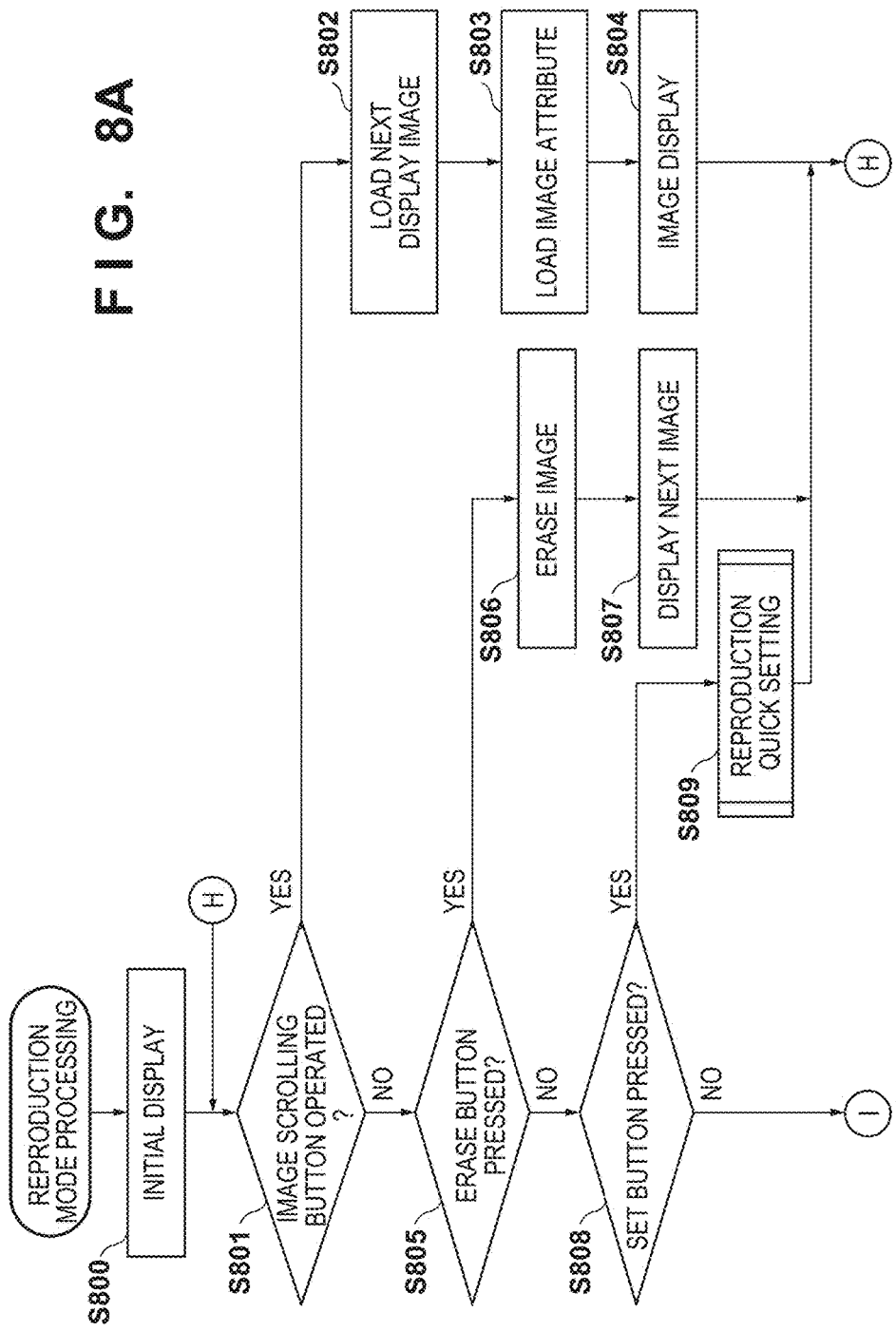

In step S1012, the system control unit 201 determines whether or not the mode switching button 103 is at the position for the creative assist mode, and if it is at the position for the creative assist mode, the processing moves to step S1013, and if not, the processing moves to step S801 in FIG. 8A.

In step S1013, the system control unit 201 makes the transition to the creative assist mode, which is one of the shooting modes, and performs the above-described processing of FIGS. 6A and 6B. In other words, switching from the reproduction mode to the shooting mode is performed here. In this case, by performing guidance display, the user may be notified of the fact that the creative settings obtained from the reproduced image are to be reflected and the shooting mode is to be switched to. Also, it is possible to display guidance for warning that the settings that were set before reflection of the creative settings obtained from the reproduced image will be overwritten and erased. After switching to the creative assist mode, the creative settings (setting values for the background blurring amount, brightness, contrast, vividness, tint, and monochrome) are set to the values obtained from the attribute information of the image that was being reproduced immediately before. These are the setting values that were stored in the non-volatile memory 213 in step S1011 above. That is to say, it is possible to perform shooting with creative settings that are the same as those used when a reproduced image was shot. At this time, guidance may be displayed along with the through-the-lens image so as to notify the user of the fact that the current creative settings have been obtained from the reproduced image. Also, a compressed version of the reproduced image from which the creative settings were referenced may be displayed in a superimposed manner on the through-the-lens image, whereby the reproduced image on which the settings were based is made clear. It is easier for the user to judge what kind of object the current creative settings are effective for. If setting registration processing such as that described above with reference to FIGS. 6A and 6B is performed after the transition to the creative assist mode, it is possible to register the creative settings obtained from the reproduced image. If registered, the creative settings obtained from the reproduced image can be read out from a list of registered settings and used as needed instead of being used only temporarily, even if the reproduced image is not stored thereafter.

As described above, if the mode switching button 103 is not at the position for the creative assist mode in step S1012, the processing moves to step S801 in FIG. 8A. That is to say, in this case, the reproduction mode does not end (no transition to the shooting mode is made). However, since the creative settings obtained from the reproduced image in step S1011 are stored, if the creative assist mode is set according to a user operation thereafter, the creative settings obtained from the reproduced image in step S1011 are reflected as initial settings.

In step S1014, the system control unit 201 performs processing according to a selected item that is among the items displayed in the left item column 1101, the right item column 1102, and the item content display region 1103 and is not the reflection icon 1130. For example, resizing processing or trimming processing can be performed as the processing of the other item with respect to the image being displayed.

In step S1015, the system control unit 201 determines whether or not the menu button included in the operation unit 104 has been pressed. If the menu button has not been pressed, the processing returns to step S1000 and is repeated, and if the menu button has been pressed, the display of the reproduction quick setting screen is ended, the processing moves to step S801 in FIG. 8A, and the processing of the reproduction mode is continued.

As described above, if the mode switching button 103 has been set to the position for the creative assist mode while the creative assist image is being displayed, the creative settings for the image being displayed are easily reflected, a transition to the shooting mode is made immediately, and shooting can be performed. In other words, switching from the reproduction mode to the shooting mode is performed and shooting can be performed immediately using the same shooting settings as in an image shot in the creative assist mode.

Note that since the shooting settings for when the reproduced image was shot can be reflected based on the attribute information of the reproduced image as described above, it is also possible to perform settings that are the same as those used when shooting an image acquired from another camera via the communication unit 217. That is to say, it is possible for a user to set his or her own camera to the same settings as those used in a favorite photograph shot by a third party.

Note that in the present embodiment, a configuration is used in which shooting settings are reflected based on the attribute information of the image, but the shooting settings may also be managed apart from the images. Thus, although it is difficult to distribute a photograph shot by a famous photographer as-is due to problems involving copyright, a file can be acquired in which only the shooting settings thereof are extracted. Thus, using a camera belonging to the user, it is possible to replicate settings that are the same as those used when the famous photographer shot the photograph.

Also, an image that was not shot in the creative assist mode can be treated as a creative assist mode image by performing image analysis on it and extracting the corresponding shooting settings. By doing so, it is possible to learn photography from more images, which can be applied to one's own photographs.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above-described embodiments are merely illustrative embodiments of the present invention, and may be combined where appropriate.

Although the above-described embodiments have described an example in which the present invention is applied to an image capturing apparatus such as a digital camera, the present invention is not limited to this example. The present invention is applicable to, for example, an image capturing apparatus having a mode in which shooting of an image can be performed with effects such as a background blurring amount, brightness, tint, contrast, vividness, and monochrome added. The present invention is also applicable to, for example, an image processing apparatus which is capable of performing image processing by changing image processing parameters such as brightness, tint, contrast, vividness, and monochrome. More specifically, the present invention is applicable to a tablet, a smart phone which is a kind of mobile telephone terminal, a PDA (Personal Digital Assistant), a mobile image viewer, a game console, an electronic book reader, a personal computer and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-223190, 2014-223350 and 2014-223351 filed Oct. 31, 2014 which are hereby incorporated by reference herein in their entirety.

What is claimed is:

1. An image capturing apparatus comprising a memory storing a program and a calculation processing device for executing the program stored in the memory, the calculation processing device:
    switching, in response to an instruction from a user, an operation mode of the image capturing apparatus to one of a plurality of operation modes including a shooting mode and a reproduction mode;
    performing control such that a reproduced image is displayed in the reproduction mode; and
    performing control such that, when the reproduced image is displayed in the reproduction mode, in response to accepting a specific instruction, based on attribute information of the reproduced image being displayed, at least a part of settings from shooting settings for when the reproduced image was shot are set in the image capturing apparatus, switching from a reproduction mode to a shooting mode is performed without any user operation after the specific instruction, and a live view image in which the part of settings are reflected is displayed without any user operation after the specific instruction.

2. The apparatus according to claim 1, wherein
when the reproduced image is displayed in the reproduction mode, the calculation processing device performs control such that a display item for giving the specific instruction is displayed if shooting settings based on attribute information of the reproduced image can be set.

3. The apparatus according to claim 2, wherein
if the reproduced image is an image shot in a specific shooting mode, the calculation processing device performs control such that the display item is displayed.

4. The apparatus according to claim 1, wherein
before the specific instruction is accepted in the reproduction mode, the calculation processing device performs control such that guidance is displayed which indicates that a shooting mode will be switched to if the specific instruction is accepted.

5. The apparatus according to claim 1, wherein the calculation processing device further
    performs setting to one of a plurality of shooting modes, wherein when the specific instruction is accepted, if the set shooting mode is a specific shooting mode, the calculation processing device sets the part of the settings in the image capturing apparatus and performs switching from a reproduction mode to the specific shooting mode, and
    when the specific instruction is accepted, if the setting of the shooting mode is not the specific shooting mode, the calculation processing device performs control such that a transition from the reproduction mode to the shooting mode is not made.

6. The apparatus according to claim 5, wherein
upon accepting the specific instruction in the case where a reproduced image is being displayed in the reproduction mode and the set shooting mode is not the specific shooting mode, if the specific shooting mode is switched to in response to a subsequent operation from the user, the calculation processing device performs control such that the part of the settings are set in the image capturing apparatus and a live view image in which the part of settings are reflected is displayed.

7. The apparatus according to claim 6, wherein
if the reproduced image is being displayed in the reproduction mode and the set shooting mode is not the specific shooting mode, the calculation processing device performs control such that guidance is displayed which indicates that the part of the settings can be set in the image capturing apparatus by switching to the specific shooting mode after the specific instruction.

8. The apparatus according to claim 1, wherein
the shooting settings for when the reproduced image was shot set by the calculation processing device is at least one of a background blurring amount, brightness, tint, contrast, vividness, a monochrome setting, aperture, exposure correction, white balance, and a setting for image processing.

9. The apparatus according to claim 3, wherein
the specific shooting mode is a shooting mode in which settings for aperture, exposure correction, and white balance are set by the user as setting items relating to blurring, brightness, and tint, respectively.

10. The apparatus according to claim 1, wherein
the calculation processing device performs control such that the part of the settings is displayed along with the reproduced image.

11. The apparatus according to claim 1, wherein
when the part of the settings is to be set in the image capturing apparatus, the calculation processing device performs control such that guidance is displayed which indicates that a shooting setting set before the part of setting will be overwritten.

12. The apparatus according to claim 1, wherein the calculation processing device performs control such that the part of the settings is set in the image capturing apparatus and if switching from a reproduction mode to a shooting mode is performed, guidance is displayed which indicates that current settings are based on a reproduced image.

13. The apparatus according to claim 1, wherein
the calculation processing device performs control such that the part of the settings is set in the image capturing apparatus and if switching from a reproduction mode to a shooting mode is performed, the reproduced image is displayed along with the live view image.

14. A control method of an image capturing apparatus comprising:
   according to an instruction from a user, switching an operation mode of the image capturing apparatus to one of a plurality of operation modes including a shooting mode and a reproduction mode;
   performing control such that a reproduced image is displayed in the reproduction mode; and
   performing control such that, when the reproduced image is displayed in the reproduction mode, in response to accepting a specific instruction, based on attribute information of the reproduced image being displayed, at least a part of settings from shooting settings for when the reproduced image was shot are set in the image capturing apparatus, switching from a reproduction mode to a shooting mode is performed without any user operation after the specific instruction, and a live view image in which the part of settings are reflected is displayed without any user operation after the specific instruction.

15. A non-transitory computer-readable storage medium storing a program for causing a computer to
   switch, in response to an instruction from a user, an operation mode of the image capturing apparatus to one of a plurality of operation modes including a shooting mode and a reproduction mode,
   perform control such that a reproduced image is displayed in the reproduction mode, and
   perform control such that, when the reproduced image is displayed in the reproduction mode, in response to accepting a specific instruction, based on attribute information of the reproduced image being displayed, at least a part of settings from shooting settings for when the reproduced image was shot are set in the image capturing apparatus, switching from a reproduction mode to a shooting mode is performed without any user operation after the specific instruction, and a live view image in which the part of settings are reflected is displayed without any user operation after the specific instruction.

* * * * *